US008510145B2

(12) United States Patent
Rowland

(10) Patent No.: US 8,510,145 B2
(45) Date of Patent: Aug. 13, 2013

(54) METHOD AND SYSTEM FOR EVENT PLANNING

(75) Inventor: Joseph Rowland, Setauket, NY (US)

(73) Assignee: Bed Bath & Beyond Procurement Co. Inc., Farmingdale, NY (US)

( * ) Notice: Subject to any disclaimer, the term of this patent is extended or adjusted under 35 U.S.C. 154(b) by 1405 days.

(21) Appl. No.: 12/069,912

(22) Filed: Feb. 13, 2008

(65) Prior Publication Data

US 2008/0201196 A1    Aug. 21, 2008

Related U.S. Application Data

(60) Provisional application No. 60/901,072, filed on Feb. 13, 2007.

(51) Int. Cl.
*G06Q 10/00* (2012.01)
*G06Q 30/00* (2012.01)

(52) U.S. Cl.
USPC ........ 705/7.13; 705/7.11; 705/26.1; 705/27.1

(58) Field of Classification Search
USPC ............................................... 705/7.11–7.42
See application file for complete search history.

(56) References Cited

U.S. PATENT DOCUMENTS

| | | | | |
|---|---|---|---|---|
| 6,493,742 | B1 * | 12/2002 | Holland et al. | 709/200 |
| 6,506,056 | B1 * | 1/2003 | DeMedio | 434/72 |
| 2002/0042775 | A1 * | 4/2002 | Nelson et al. | 705/39 |
| 2002/0156787 | A1 * | 10/2002 | Jameson et al. | 707/10 |
| 2006/0271381 | A1 * | 11/2006 | Pui | 705/1 |

OTHER PUBLICATIONS

Gifts.com Introduces 'The Wedding Gift Center'; Comprehensive Service Includes a Bridal 'Registry Finder,' Gift Recommendations and Gifting Etiquette Tips; Gifts.com Also Announces Partnership With TheKnot.com to Extend the 'Registry Finder' Service to TheKnot.com Users, PR Newswire, May 15, 2006.*
mywedding.com, http://web.archive.org/web/20060111060734/www.mywedding.com/main/index.html.

* cited by examiner

*Primary Examiner* — Jason Dunham
*Assistant Examiner* — Amber Altschul
(74) *Attorney, Agent, or Firm* — Lerner, David, Littenberg, Krumholz & Mentlik, LLP

(57) ABSTRACT

The present invention provides systems and methods for planning important events such as weddings, milestone birthday parties and the like. A suite of computer-implemented applications perform various aspects of event management, including guest list and seating management, task planning, vendor selection, budget control and gift recordation and tracking. The data gathered, processed and stored by different portions of the application suite is used seamlessly by other portions of the application suite to synergistically enhance the overall functioning of the system. The system may be a web-based Internet implementation where brides and other users can input and manipulate the information for the event planning system. Guests are provided a unique URL to a web page about the wedding, which contains information about the bride and groom. Guest preferences can be input and that information used to coordinate seating. The budgeter provides the user with task and vendor details to optimize planning.

41 Claims, 20 Drawing Sheets

FIG. 7A

| other wedding events | | ■ |
|---|---|---|
| event | invited | attending |
| engagement party | ☐ | ☐ |
| bridal shower | ☐ | ☐ |
| bachelorette party | ☐ | ☐ |
| bachelor party | ☐ | ☐ |
| rehearsal dinner | ☐ | ☐ |
| pst event brunch | ☐ | ☐ |
| other | ☐ | ☐ |

| photo instruction | ✚ |
|---|---|
| interests | ✚ |
| gift information | ✚ |

[ save changes ] [ undo changes ]

FIG. 7B

| other wedding events | ✚ |
|---|---|
| photo instruction | ■ |

☑ include on Photographer's list
Photographer's instructions

| | |
|---|---|
| interests | ✚ |
| gift information | ✚ |

[ save changes ] [ undo changes ]

FIG. 7C

| other wedding events | ✚ |
|---|---|
| photo instruction | ✚ |
| interests | ■ |

| rank | 1 | 2 | 3 | 4 | 5 |
|---|---|---|---|---|---|
| sports | ☆ | ☆ | ☆ | ☆ | ☆ |
| politics | ☆ | ☆ | ☆ | ☆ | ☆ |
| music | ☆ | ☆ | ☆ | ☆ | ☆ |
| literature | ☆ | ☆ | ☆ | ☆ | ☆ |
| cooking | ☆ | ☆ | ☆ | ☆ | ☆ |
| showbiz | ☆ | ☆ | ☆ | ☆ | ☆ |

| gift information | ✚ |
|---|---|

[ save changes ] [ undo changes ]

FIG. 7D

| other wedding events | ✚ |
|---|---|
| photo instruction | ✚ |
| interests | ■ |
| gift information | ✚ | shower gift | wedding gift | other gift gift                date rec.

money
$ [    ]

⦿ cash   ○ check   ○ gift card
note sent    date rec.
   ☐          [    ]
notes/comments:
[                    ]

[ save changes ] [ undo changes ]

FIG. 8    230
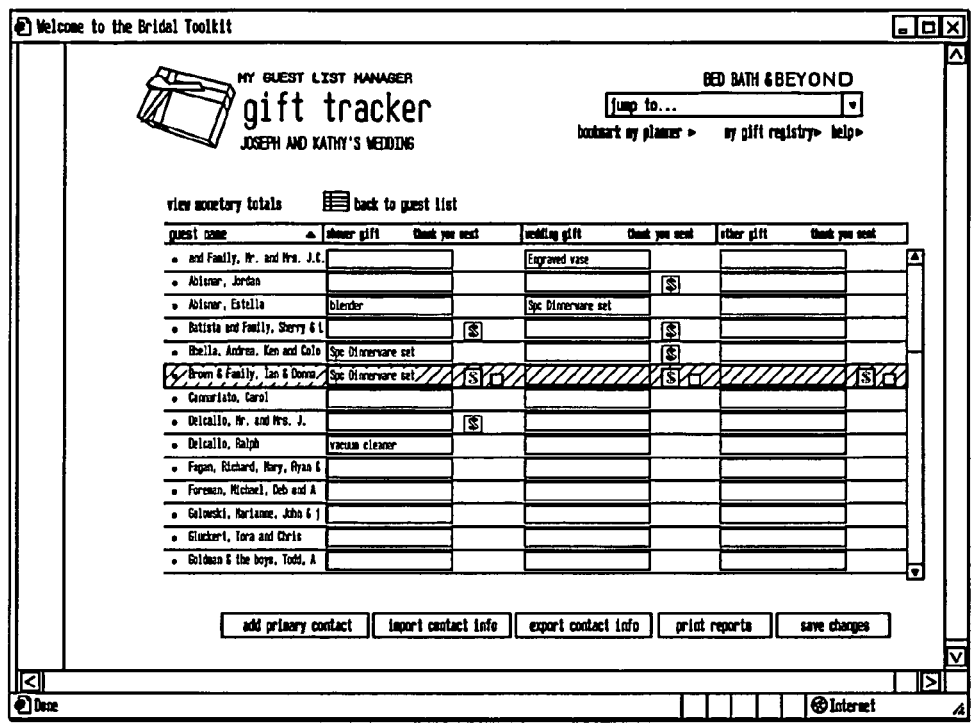
FIG. 9    240
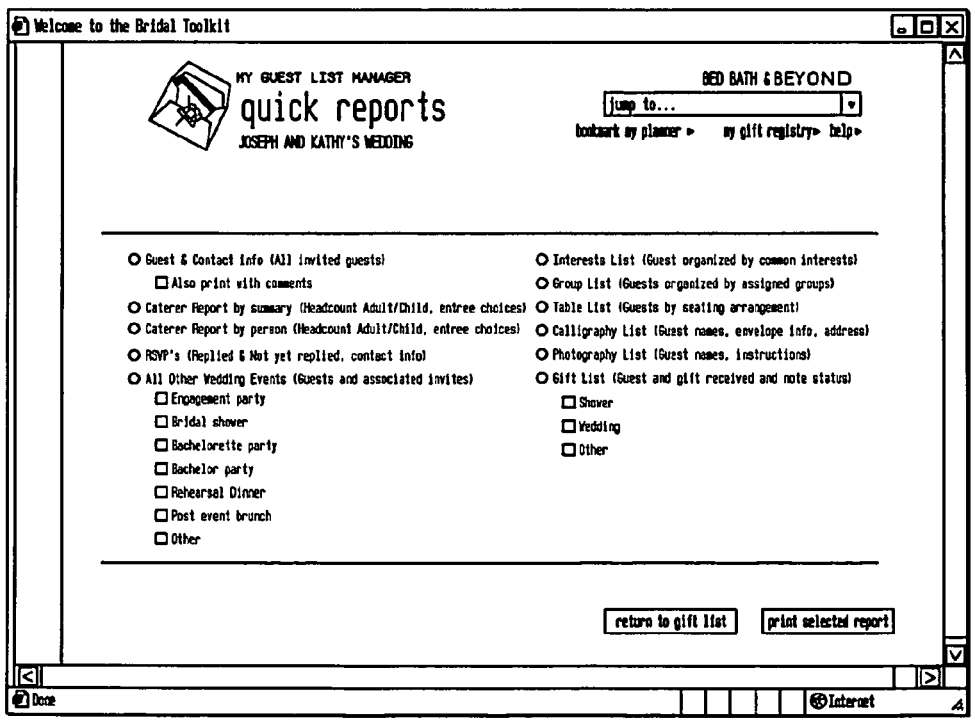

METHOD AND SYSTEM FOR EVENT PLANNING

CROSS-REFERENCE TO RELATED APPLICATION

This application claims the benefit of U.S. Provisional Patent Application No. 60/901,072, filed Feb. 13, 2007 and entitled "Method and System for Event Planning," the entire disclosure of which is hereby expressly incorporated by reference herein.

BACKGROUND OF THE INVENTION

The present invention relates generally to a method and system for planning events. The invention advantageously allows disparate applications to synergistically exchange information to enhance each application's functions.

Planning for major events such as weddings, milestone birthdays, surprise parties, anniversaries, holiday parties and the like can be a time consuming, expensive and often times daunting process. A myriad of tasks must be performed and innumerable choices need to be made. For example, one must decide where to hold the event, how many guests to invite, how to arrange seating for the guests, choose flower arrangements, select a photographer, provide travel information for out of town guests, etc.

Such tasks and choices do not all happen at once. For instance, in the case of a wedding, planning and preparing for the event may take up to a year or more. And regardless of the type of event being planned, budget limitations are often a major factor in planning the event. Furthermore, the person(s) hosting the event must take the time to do the planning.

Of course, one could hire a professional scheduler to do some or all of the planning. However, this may substantially increase the expense of the event. It can also reduce the amount of control the bride or other planner has over the event.

In view of this, a need exists for a convenient way to plan and manage events to overcome these and other problems.

SUMMARY OF THE INVENTION

The present invention provides a number of different ways to enable a person to plan events efficiently and conveniently, and it also enables a person to save, retrieve an modify details and aspects of the event.

For instance, one aspect of the invention relates to a suite of event planning software that is particularly advantageous in connection with weddings and the like. It includes a seating arranger, which intelligently and automatically allocates participants, such as wedding guests, to particular tables. It also includes a task manager, which allows the user to manage a variety of pre-defined and user-defined and managed date-based tasks.

Another aspect of the invention includes a time line that works synergistically with the tasks. In this regard, certain information from the tasks is used to render information, in scale, along a time line. The suite may advantageously also include a guest list manager which is integrated with the seating arranger. The guest list manager allows information to be stored and managed with respect to individual guests and groups of guests.

The seating arranger is configured to rely on different combinations of different types of information to automatically allocate seats. The seats may be allocated based on interests maintained by the guest list manager, guest groups maintained by the guest list manager, or a random number generator.

Yet another application that may be used in connection with the suite is a budgeter, which can be used to track, budget and predict costs.

A variety of other functions may also be used in connection with the invention. By way of example, virtual sticky notes can be applied to the task as a reminder of important information associated with a specific task in the Task Manager.

The guest list manager may also store various information, such as guests' entree choice, their family group, whether they should be sat at a table with other members of their family group, whether they have been invited to other related events (such as the engagement party or bachelor party) and tracking their associated responses, instructions for the photographer particular to individual guests, various potential interests (in many different categories), and the gifts they received.

The invention also advantageously provides for the ability to report various information maintained by the foregoing.

Although the invention is particularly advantageous when used in connection with weddings, various aspects may be used with different events as well. Accordingly, the following description should be understood to provide just one example of the invention.

In accordance with one embodiment of the present invention, a system for event planning comprises a task manager and a timeline manager. The task manager is operable to generate a series of predefined tasks pertaining to an event being planned, to modify one or more of the predefined tasks and to add new tasks in response to user input, and to rank selected ones of the predefined and new tasks based upon a ranking criteria. The timeline manager is operable to obtain the predefined and new tasks from the task manager, to receive a timeframe boundary from the task manager or from user input, and to display a timeline on a user display according to the timeframe boundary, the timeline identifying at least some of the predefined and new tasks falling within the timeframe boundary. A higher priority task is more prominently displayed on the user display along the timeline than a lower priority task and a set of highest priority tasks are simultaneously displayed on the user display separately from the timeline.

In one alternative, the system further comprises a budget manager operable to set an expense budget for the event. In this case, the budget manager is preferably further operable to associate a vendor with a line item expense for a given task.

In another alternative, the task manager is further operable to associate a virtual sticky note with a given task, and the timeline manager is further operable to display the virtual sticky note on the user display when the given task is displayed on the timeline.

In yet another alternative the event is a wedding. In this case, a first one of the predefined tasks is procuring a wedding gown and the wedding gown task is one of the highest priority tasks.

In accordance with another embodiment of the present invention, a system for event planning comprises a guest list manager and a seating manager. Here, the guest list manager is operable to prepare a list of guests for an event being planned, to set group information for selected ones of the guests, to associate contact information with respective ones of the guests, to associate interest information with certain ones of the guests, and to generate a graphical interface of the guest list for displaying to a user on a display. The seating manager is operable to obtain a list of attendees to the event from the guest list manager. The list of attendees is a subset of the guest list. The seating manager is further operable to generate a virtual event configuration on the display in response to user input. The configuration includes seating for at least some of the attendees on the list of attendees. And the seating manager is also operable to assign seats for the at least some of the attendees, wherein the seats are assigned based upon an assignment criteria.

In one example, the assignment criteria is selected from among the group of randomize, seat according to group information, seat according to preferences, and seat according to guest interests. In this case, the seating manager preferably provides an interactive interface for the user to select table size and table placement in the virtual event configuration.

In another example, a first set of the seats are assigned according to group information, a second set of the seats are assigned according to guest interests and a third set of the seats are assigned by the user. In this case, a fourth set of the seats may be randomly assigned.

In yet another example, the system further comprises a task manager operable to generate a series of tasks pertaining to the planned event. Here, a first one of the tasks includes obtaining and storing the guest contact information and a second one of the tasks includes obtaining and storing the guest interest information. The guest list manager is further operable to retrieve the stored guest contact information and the guest interest information for processing.

In accordance with yet another embodiment of the present invention, a system for planning a wedding comprises a guest list manager, a seating manager and a wedding task manager. The guest list manager is operable to prepare a list of guests for the wedding, to associate contact information with respective ones of the invited guests for sending out and keeping track of invitations, and to generate a graphical interface of the guest list for displaying to a user on a display. The seating manager is operable to generate a virtual wedding reception configuration on the display in response to user input. The configuration includes seating for attendees identified from the list of guests. The seating manager is also operable to assign seats for the attendees based upon an assignment criteria. And the wedding task manager is operable to generate a series of tasks pertaining to the wedding. A first one of the tasks includes obtaining and storing guest contact information. The guest list manager is further operable to retrieve the stored guest contact information for processing.

According to another embodiment of the present invention, an event planning method comprising generating a series of predefined tasks pertaining to an event being planned; modifying one or more of the predefined tasks; adding new tasks in response to user input; ranking selected ones of the predefined and new tasks based upon a ranking criteria; and receiving a timeframe boundary; and displaying a timeline on a user display according to the timeframe boundary, the timeline identifying at least some of the predefined and new tasks falling within the timeframe boundary. Here, a higher priority task is more prominently displayed on the user display along the timeline than a lower priority task. Also, a set of highest priority tasks are simultaneously displayed on the user display separately from the timeline.

In one alternative, the method further comprises setting an expense budget for the event. In this case, the method preferably comprises associating a vendor with a line item expense for a given task.

In another alternative, the method further comprises associating a virtual sticky note with a given task; and displaying the virtual sticky note on the user display when the given task is displayed on the timeline.

In a further alternative, the event is a wedding. In this case, a first one of the predefined tasks is procuring a wedding gown, and the wedding gown task is one of the highest priority tasks.

In yet another embodiment of the present invention, a method for event planning comprises preparing a list of guests for an event being planned; setting group information for selected ones of the guests; associating contact information with respective ones of the guests; associating interest information with certain ones of the guests; generating a graphical interface of the guest list for displaying to a user on a display; obtaining a list of attendees to the event, the list of attendees being a subset of the guest list; generating a virtual event configuration on the display in response to user input, the configuration including seating for at least some of the attendees on the list of attendees; and assigning seats for the at least some of the attendees, wherein the seats are assigned based upon an assignment criteria.

In one alternative, the assignment criteria is selected from among the group of randomize, seat according to group information, seat according to preferences, and seat according to guest interests.

In another alternative, a first set of the seats are assigned according to group information, a second set of the seats are assigned according to guest interests and a third set of the seats are assigned by the user. In this case, a fourth set of the seats may be randomly assigned.

In yet another alternative, the method further comprising generating a series of tasks pertaining to the planned event, a first one of the tasks including obtaining and storing the guest contact information and a second one of the tasks including obtaining and storing the guest interest information; and retrieving the stored guest contact information and the guest interest information for processing.

In accordance with a further embodiment of the present invention, a computer-implemented method for planning a wedding comprises preparing a list of guests for the wedding; associating contact information with respective ones of the invited guests for sending out and keeping track of invitations; storing the contact information in a memory of a processor device; generating a graphical interface of the guest list for displaying to a user on a display; generating a virtual wedding reception configuration on the display in response to user input, the configuration including seating for attendees identified from the list of guests; assigning seats for the attendees based upon an assignment criteria; generating a series of tasks pertaining to the wedding, a first one of the tasks including obtaining and storing guest contact information; retrieving the stored guest contact information; and the processor device processing the stored guest contact information to generate guest list information.

BRIEF DESCRIPTION OF THE DRAWINGS

FIGS. 7A-D illustrate features of the guest list manager of FIGS. 6A-C.

FIG. 8 illustrates a gift tracking application in accordance with aspects of the present invention.

FIG. 9 illustrates a reporting application in accordance with aspects of the present invention.

DETAILED DESCRIPTION

Figure 1:
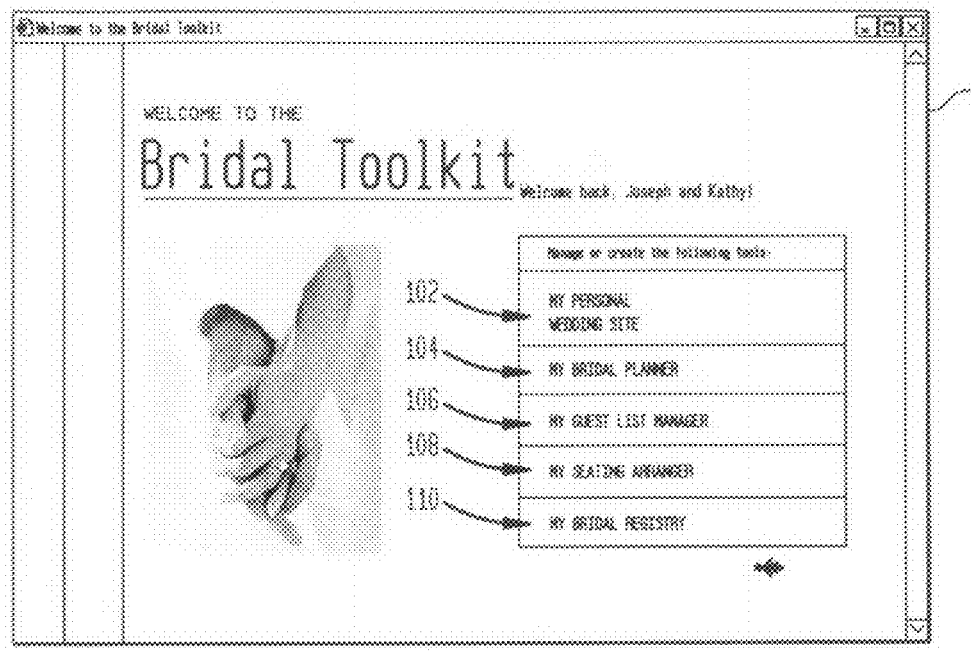
FIG. 1 illustrates an interface for an event planning system in accordance with aspects of the present invention.

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

In one embodiment of the present invention, an event planning system is geared towards planning a wedding. Of course, while the examples and explanations are provided with regard to a wedding, it should be understood that the features and benefits of the system apply to many other types of events.

In a preferred example, a browser-based wedding planning system is provided. FIG. 1 illustrates a graphical user interface ("GUI") 100 for a "Bridal Toolkit." This is preferably presented as a welcome screen in a web-based solution which allows a person such as a bride or groom to access the various aspects of planning for the wedding. By way of example only, the interface 100 may include links to "My Personal Wedding Site" 102, "My Bridal Planner" 104, "My Guest List Manager" 106, "My Seating Arranger" 108 and/or "My Bridal Registry" 110. The titles of the various links are merely exemplary. What is important are the features provided by the applications which are linked on the welcome screen.

For instance, link 102 for My Personal Wedding Site gives the user access to an application which allows the user, e.g. a bride, to build, edit, and publish a Bridal Website with details about her event. Customizable colors, fonts, watermarks and the like are available to uniquely personalize a bride's site to her taste and personality. The user also has the option to upload photographs that can be incorporated into the Bridal Website.

Link 104 for My Bridal Planner preferably presents the bride with numerous pre-established tasks that may be performed during a 'typical 12 month long' engagement cycle. Brides have the option to delete, add or modify any of the tasks displayed. As will be discussed in more detail below, the Bridal Planner may include a link to a timeline view which presents a 'snapshot' version of upcoming tasks using a visual perspective of time. This allows a bride or another user to sort tasks using various views based on, e.g., priority, category, finished, assigned to, time period, etc.

Link 106 for My Guest List Manager allows brides or other users to import or create a guest list of invitees and track responses to their wedding event. A summary list view is preferably presented, although a more detailed index card view of guest data is also available.

Link 108 for My Seating Arranger preferably integrates to the Guest List Manager and allows brides to interactively create their event location schematic and drag and drop guests to their tables.

And link 110 for My Bridal Registry preferably provides a link back to the bride's registry.

While the five links discussed above are desirably presented on the Bridal Toolkit welcome screen, fewer links may be utilized if lesser functionality is required. Conversely, other links may be included to handle additional features. By way of example only, there may be a link to a budgeting application. As will be explained in more detail below, the budgeting application desirably allows brides to develop an event budget, display actual to budgeted variances by expense category and manage event vendors.

Figure 2:
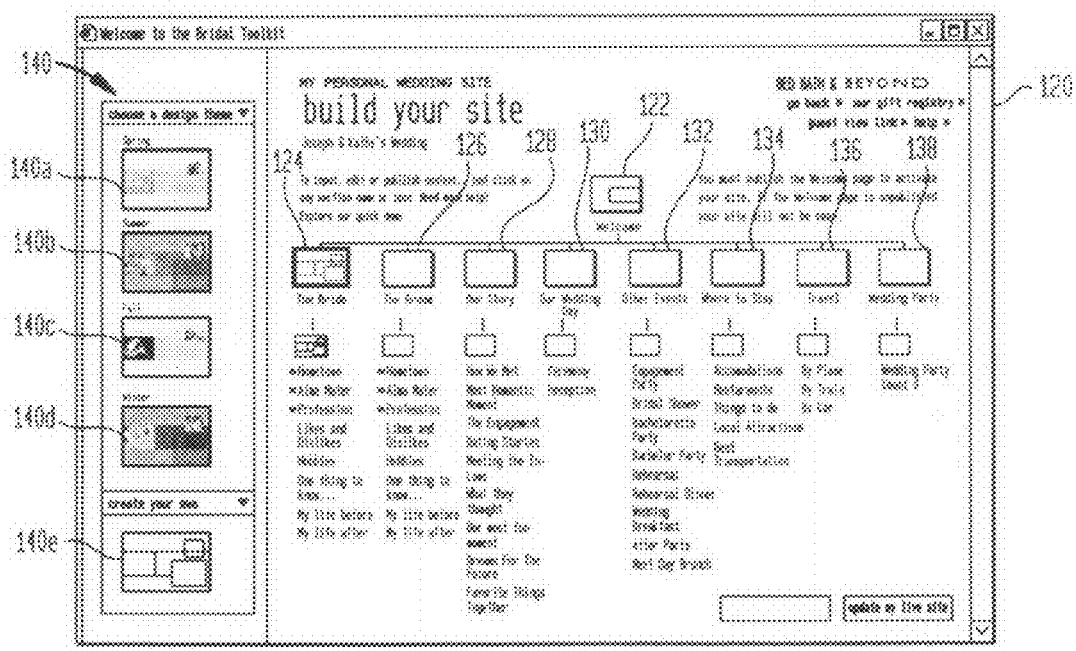
FIG. 2 illustrates a preferred management interface for the event planning system.

In the browser-based GUI 100, when the user selects link 102, he or she is preferably presented with a site editor 120 for My Personal Wedding Site as shown in FIG. 2. The site editor 120 allows a bride or other user to customize an existing template, or create their own template, and "publish" a wedding website with information specific to their wedding event.

The wedding website may include numerous sections or "pages" that can be customized. For instance, as seen in FIG. 2, there may be a "welcome" section 122, a "bride" page 124, a "groom" page 126, an "our story" page 128, an "our wedding day" page 130, an "other events" page 132, a "where to stay" page 134, a "travel" page 136 and a "wedding party" page 138.

Section 122 can be used to provide a welcome description or introduction to the personalized Wedding Site. The bride page 124 may provide biographical data about the bride, such as her hometown, alma mater, profession, photographs, etc. Similarly, the groom page 126 may provide biographical data about the groom, such as his hometown, alma mater, profession, photographs, etc.

The "our story" page 128 preferably provides information about how the couple met, favorite things, etc. And the "our wedding day" page 130 desirably includes information about the ceremony and reception. The "other events" page 132 may include information about events relating to the wedding, such as a rehearsal dinner, bachelor and bachelorette parties, honeymoon information, etc.

The "where to stay" page 134 desirably provides information regarding hotels and restaurants in the area which may be useful for out of town guests. For instance, one or more preferred hotels may be identified with information about special rates for guests who mention that they are attending the wedding. The "travel" page 136 provides guests with information about how to get to the wedding. This may include maps and driving directions, train information, flight information, etc. Using an edit feature, the user has the ability to embed hyperlinks to specific URLS. This provides convenient access to information, such as driving directions, hotel information, etc.

And the "wedding party" page 138 can be used to provide information about members of the couple's wedding party.

For instance, this page may list the groomsmen and best man, identifying how they know or are related to the groom. It may also list the bridesmaids and maid of honor, identifying how they know or are related to the groom.

Also shown in FIG. 2 is the design theme section 140. Here, several pre-selected design themes, such as templates 140*a-d*, are available using various color schemes (e.g., spring, summer, fall and winter). A user may select one of these templates 140*a-d*. Each template is preferably fully editable and customizable in terms of fonts, colors, etc. Alternatively, the user may choose to create one of her own with a "create your own" design theme 140*e*.

It is also desirable for the user to have the ability to add, change and update any text and/or graphics that is part of a given page. This is because these pages are where the bride or other user relays a story or provides specific information regarding a topic on the web page. For instance, the bride under the Hometown header would provide her home town and state or a variation thereof.

Figure 3A:
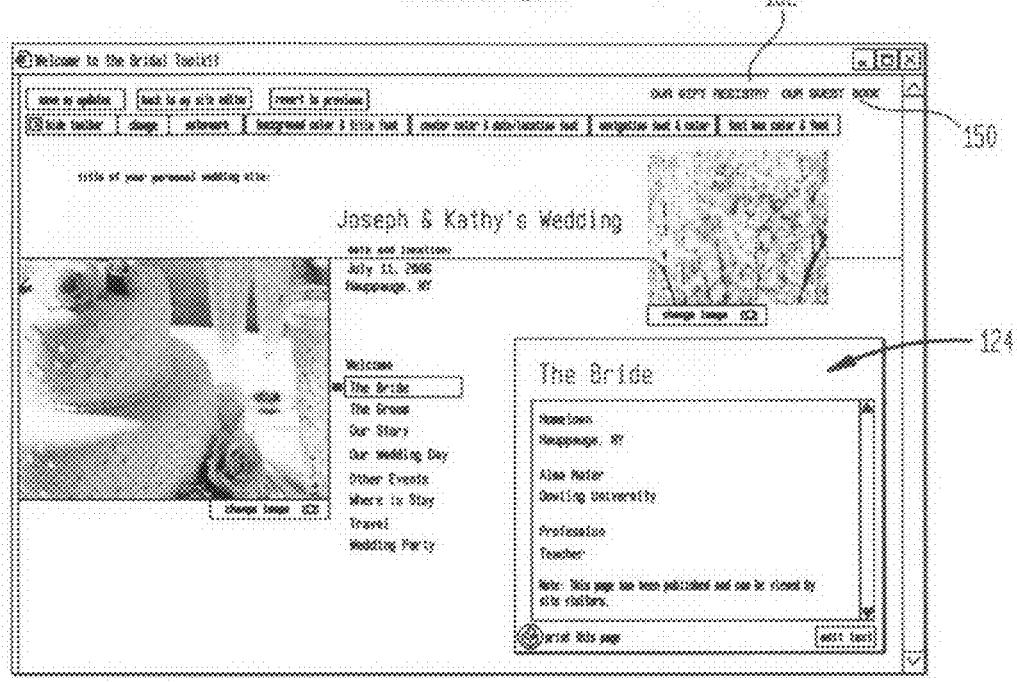
FIGS. 3A-B illustrate portions of the management interface of FIG. 2.

As shown in FIG. 3A, the Edit Page allows for background, navigation and text box colors and fonts to be changed, and unique page 'watermarks' to be selected (for a stylistic and aesthetic impact). In addition, there are preferably two sets of images displayed per page, namely the upper right, and the left side image. The site preferably comes with default images as well as a library of images the bride can use on each of her pages. If these images do not suffice, the bride can choose to upload her own image from her computer. Specific cropping requirements for the images to display properly are included in the upload page. Thus, as shown in FIG. 3A, information about the bride may state her hometown, her alma mater and her profession. She may edit the information to include her likes and dislikes or any other information she desires.

In order for guests to access the wedding information, each personal wedding site is preferably assigned a unique URL (web address) which can be emailed and sent to guests by the bride and groom. Once a guest types or pastes the URL into the address bar of their web browser or accesses the unique URL via a hot link, the personalized wedding web site appears. As the site loads the introduction may be animated. For instance, pieces of the site may float across the screen and assemble on the guest's computer screen.

Figure 3B:
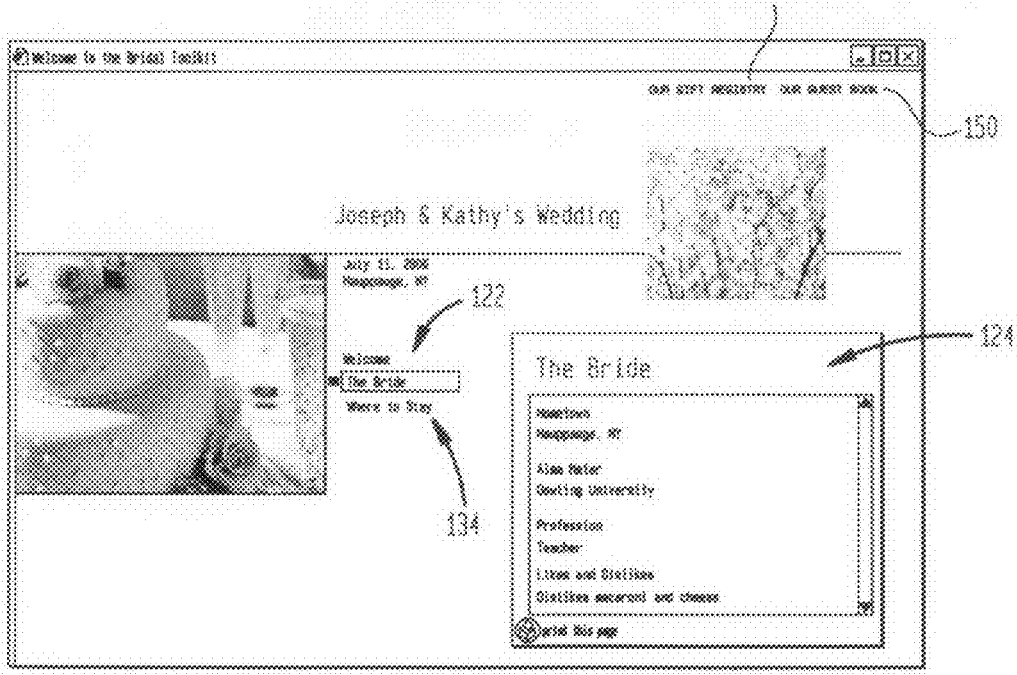
Figure 4:
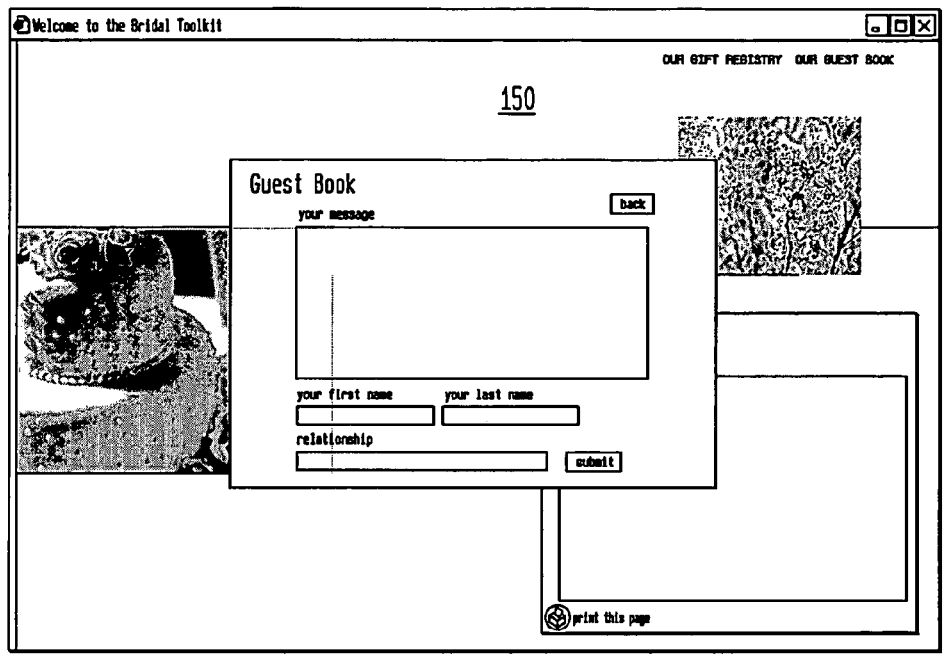
FIG. 4 illustrates a guest book in accordance with aspects of the present invention.

A guest can click on any page that has been published by the bride or other user. The image above these pages may include the welcome page 122, the bride page 124 and the where to stay page 134 as shown in FIG. 3B. Should the guest select the "our guest book" page 150, a new page will be presented. An example of guest book page 150 is shown in FIG. 4. On this page, the guest may leave a message or other well wishes for the couple. Comments that are entered are emailed or otherwise sent to the bride or other user for approval. Once approved, comments can be viewed and read by any guest clicking on the link for our guest book.

An "our gift registry" link 152 may also be provided. This links the guest or other user to the bride's registry page. The registry page may be part of the overall event planning application, or it may be a link to an external database for a retailer's bridal registry site. In either case, the guest may shop for and select a gift at this point.

As noted above, the bridal planner may include a timeline view link that provides the user with a snapshot of tasks for the wedding. An exemplary timeline page 160 is presented in FIG. 5A.

Timeline 162 provides a quick, visually appealing representation of the underlying Task Manager data. In a preferred example, there can be over 200 pre-defined tasks presented that a typical bride would perform during the course of an average 12 month engagement. The timeline 162, through the use of navigational aids, allows the bride or other user to jump to a specific date or zoom in and out of an interval of time, for example October through November, to see what upcoming tasks she has to complete during the displayed time frame. One example of a navigation aide is sliding scale 164.

Upon refresh or log-in, a useful tip or functional message 166 may be displayed on the user's display device, for instance in the lower right hand corner of the screen. The tip or message 166 may be randomly generated or linked to the actions currently being performed by the bride. The tip or message 166 may also be selected based on the tasks currently being displayed. Finally, the tip or message 166 may be keyed to products offered by the web site's sponsor.

A bride may use a "view by" section 168 to see tasks by priority, category, finished, assigned to and time period. Each of the views is meant to aid the bride in sorting through the myriad of data to quickly focus on a topic of interest. A list 170 of "top priorities" is preferably displayed in an index card fashion. If a bride completes one of these top priorities, she can check it and it will disappear from this listing. A task is considered a top priority if it is identified as such. This may be done by the user herself or automatically based upon predetermined criteria. For instance, some tasks are so important, such as purchasing the wedding gown, that the system automatically assigns them as being a top priority.

Alternatively, tasks may be ranked across a scale. For instance, the scale may range from 0 to 5, with 0 being the lowest priority and 5 being the highest priority. In this case, purchasing the wedding gown would default to a priority of 5, while selecting a cummerbund style for the groomsmen would default to a priority of 1. Priority levels may be changed at any time by the bride or other user.

The priorities of tasks can also be shown on the timeline itself, such as by sizing the boxes or other identifiers (each associated with a task) so that the size is proportional to the priority level of the task. Preferably, the tasks are placed along the timeline to scale. The scale may be linear or logarithmic (because there may be a greater distance between tasks the further one gets from the wedding day).

The tasks may also be linked with the other applications in the suite. For example, one task (e.g., a "reception" task) may suggest that the bride start compiling a guest list, and clicking on the task causes the system to display the guest list screen. The same or another task may suggest that the bride create a seating chart. The system may also mark this task "complete" if all of the guests have been assigned their seating using the seating arranger.

Figure 5A:
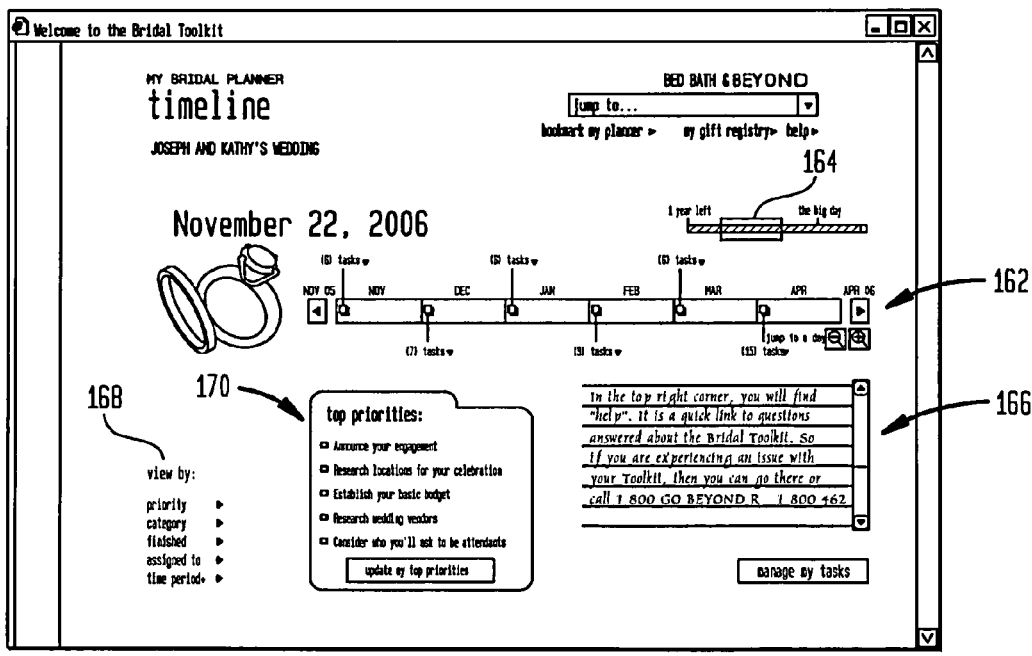
FIGS. 5A-B illustrate a timeline for the event planning system.
Figure 5B:
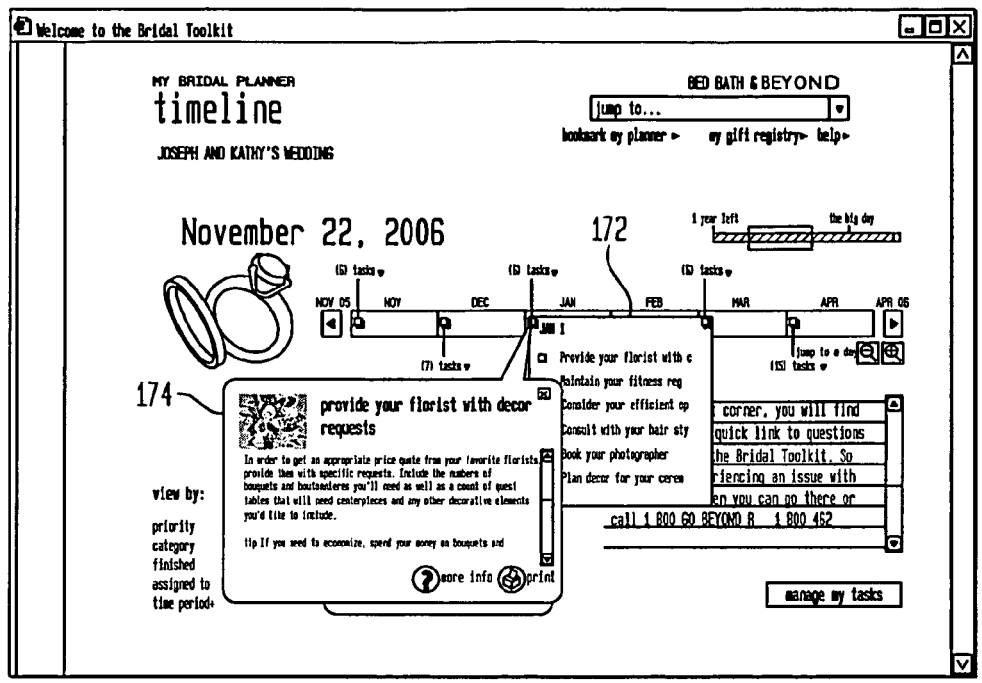

Each pre-populated task in the task manager preferably has specifically written content. One or more tasks may appear on a given date. A list 172 of such tasks is shown in FIG. 5B. The content can be accessed via the timeline (by clicking on a date and task), or via the task manager by clicking on the task description. The content of the selected task may be presented on screen via a dialogue box, popup, split screen, new page or the like. The content is meant to provide detailed information for the bride to understand the task, as well as provide helpful advice and tips on how best to complete the task. As seen in FIG. 5B, a dialog box such as popup 174 provides the detailed information.

Depending on the task, the content detail may vary in length and granularity. Each content box may be printed for filing or note taking. Each task preferably includes a due date, a short description and a long description, wherein the short description tends to be displayed more often than the long description.

A virtual sticky note may also be applied to a task, wherein a note icon appears during certain displays of tasks (assuming the task has a note attached to it). When the icon is clicked, a note opens and the bride can add and edit comments or content relating to the task.

Figure 15:
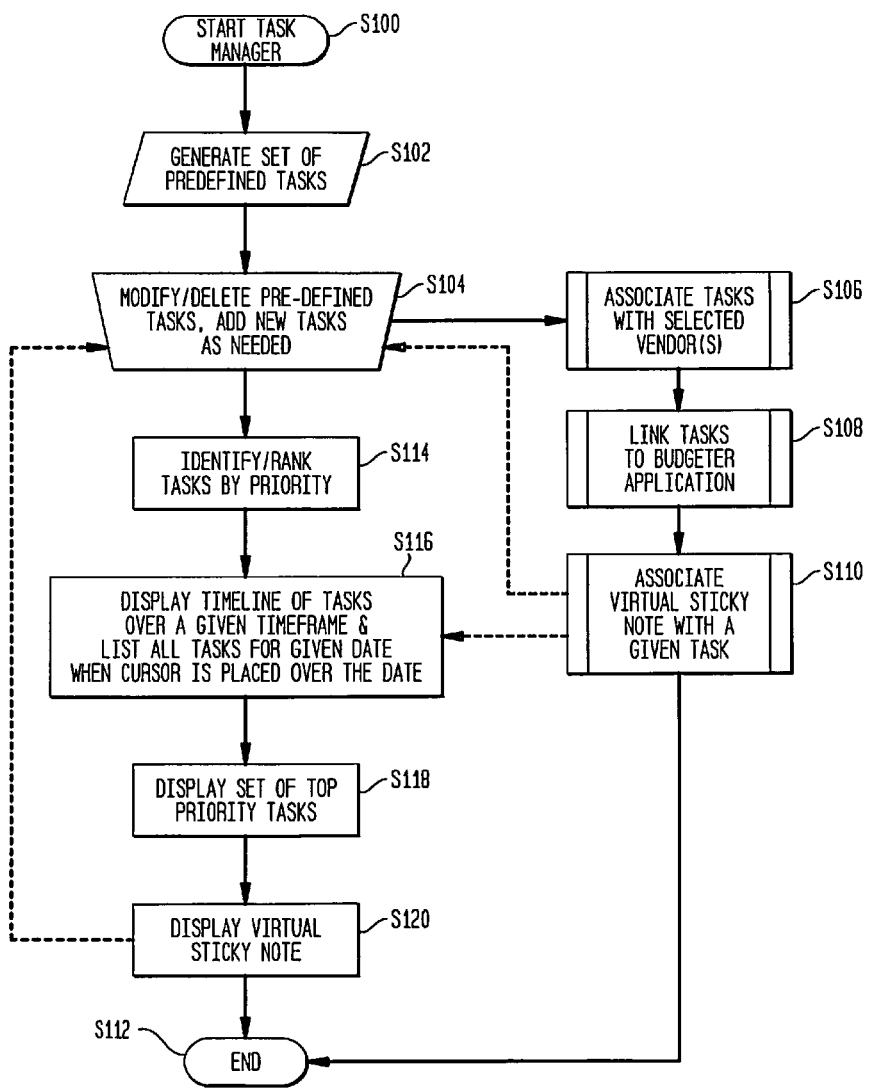
FIG. 15 illustrates a flow diagram in accordance with aspects of the present invention.

Reference is made to FIG. 15, which presents a flow diagram of a task management process in accordance with the features of the task manager discussed herein. Initially, the task manager is started at step S100. The task manager may be implemented in any number of ways. For instance, it may be a standalone application or it may be an applet, routine or a program that is initiated by another application in the event planning system.

Once started, the task manager preferably generates one or more predefined tasks as shown in step S102. The predefined tasks may be stored in a database, lookup table, spreadsheet or the like, and may be obtained via a remote link to a third party application. The predefined tasks may include generalized tasks that apply to all events, such as selecting a location and date for the event. Other predefined tasks may include tasks which are focused on a particular event, for instance choosing a wedding gown.

As shown in step S104, the bride or other user may modify or delete some or all of the predefined tasks. She may also add new tasks which are not part of the set of predefined tasks. By way of example only, a new task may be to select a pair of shoes to wear during the ceremony. Information about each task may be provided, such as the date or date range of the task, whether a vendor is needed or has been selected, the budget for the task, who is performing the task or assisting in carrying out the task.

Once the tasks have been created, they are preferably associated with vendors as needed, which is shown in step S106. It may also useful to optionally link any tasks having a cost element to the budgeter application as shown in step S108. It should be understood that some tasks may not have a cost associated with them, for instance if a friend is providing a location to hold the bridal shower. And as shown in step S110, a virtual sticky note may also be associated with a given task.

The steps S106, S108 and S110 are preferably done after step S104 has been completed. However, these steps may be done in any order or in parallel. Once done, the task manager may terminate or cease processing at step S112. Alternatively, the process may return to step S104 or may proceed as follows.

After the tasks have been created or modified, some or all of the tasks may be ranked by priority as shown in step S114. For instance, it may be sufficient to rank a task as either being a priority task or not. Alternatively, tasks may be ranked according to a selected scale. While ranking tasks is optional, it can be very useful, especially when the tasks are linked with other aspects of the event planning system discussed herein.

At this point, once tasks have been created and details about them have been entered into the task manager, users such as the bride may process and sort the tasks, and may generate reports about the tasks as needed. A graphical interface such as shown in FIG. 5A provides a timeline of the tasks. As shown by step S116, the timeline may be displayed using a GUI or the like. Beneficially, the timeline lists the tasks in a date range. And as shown in FIG. 5B, a list of tasks for a given date is displayed, for instance when the cursor is placed over that date.

Turning to step S118, a set of top/high priority tasks is also preferably displayed via the timeline GUI, for instance using a popup or callout. And at step S120, a virtual sticky note icon may appear during certain displays of tasks (assuming the task has a note attached to it). Here, when the icon is selected, the note opens and the bride or other user can add and edit comments or content relating to the task.

At this point, the task management process may terminate at step S112, or may return to step S104 for further changes to the tasks.

Figure 6A:
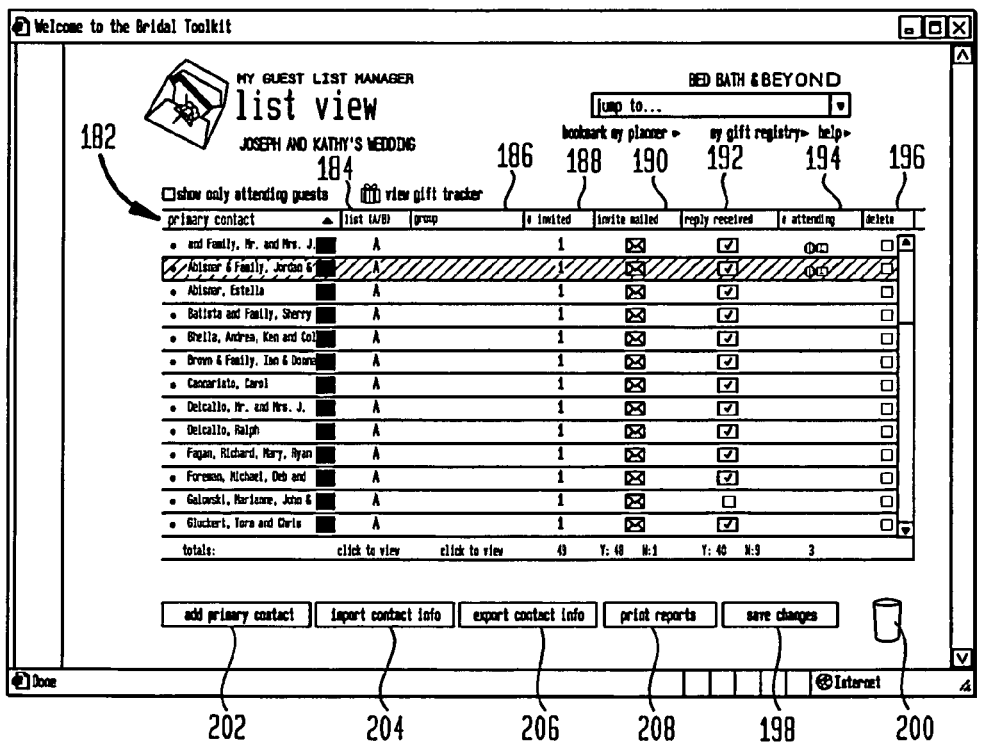
FIGS. 6A-C illustrate a guest list manager in accordance with aspects of the present invention.

Turning to the guest list manager, as discussed above this aspect of the system allows users to create or import a guest list of invitees into the system and use this list to track responses to the wedding event. FIG. 6A provides an exemplary view of the display 180 for the guest list manager.

Among other things, the guest list manager tracks wedding invitations. Its base functionality is to maintain a list of those guests invited, when their invitation was mailed, whether a response was received and whether the response was positive or negative. As shown in FIG. 6A, the guest list display 180 can provide a significant amount of data in fields.

A first field 182 is the "Primary Guest" name. A primary guest is defined as a single point of contact that is intended to receive the mailed invitation. The primary contact may also attend with "secondary" invites (e.g., spouse, children, etc.). The primary/secondary functionality facilitates the integration of Guest List Manager data into the Seating Arranger. In addition to the primary information, an A/B list information field 184 may shown. This option is useful because in some weddings, invitations are mailed in groups, first the "A" list then the "B" list. Typically, the "B" list fills voids from negative responses on the "A" list. The A/B list may be selected on the Guest List Index Card view. The primary guest and his or her associated secondary guests is often referred to herein as a single "party."

"Group" field 186 generally represents a definition of the relationship the bride and groom have with the primary contact. Examples of groups include Bride's Family, Groom's Family, Bride's parent's friends, Groom's parent's friends, Bride's friend, Groom's friend, etc.

The "# invited" field 188 indicates the number of people invited including primary and secondary contacts.

Other fields may include the "invite mailed" field 190 and the "reply received" field 192, which indicate whether an invitation was sent and a reply received, respectively. A different icon is preferably used for each (sent, not sent, reply received, reply not received).

The "# attending" field 194 displays the actual number of guests that replied "Yes" to the invitation. Note that this may not equal the number invited as people within the same party may have to decline the invitation.

Totals for some or all of the fields are preferably provided as a quick reference for the Bride and Groom to track their information.

And the "delete" field 196 allows a bride or other user to delete a primary contact by checking the delete box. Thus, when the bride saves the changes by clicking a "save changes" button 198, the deleted contact will be sent to the trash bin 200. This may be animated by showing a guest name (or associated symbol) move from the list and land in the icon of the trash bin. Any primary contact deleted can be restored by clicking on the trash bin and selecting, among the deleted contacts, the contact to be restored. New primary contacts may be added with the "add primary contact" button 202.

Contact information can be imported using a pre-established spreadsheet format such as in Excel format. This makes it easy for brides with existing information to avoid having to retype pre-existing data. An "import contact info" button 204 may be used for ease of import.

Similarly, once the Guest List Manager is populated, the bride or other user can export base information to a spreadsheet format for future reference using an "export contact info" button 206. And reports with some or all of this information may be printed using the "print reports" button 208. Of course, it should be understood that numerous presentation styles may be used in the guest list display 180 of the guest list manager. Furthermore, as with the system in general, alternative actuators may be used as part of the GUI instead of the specific buttons shown.

Figure 6B:
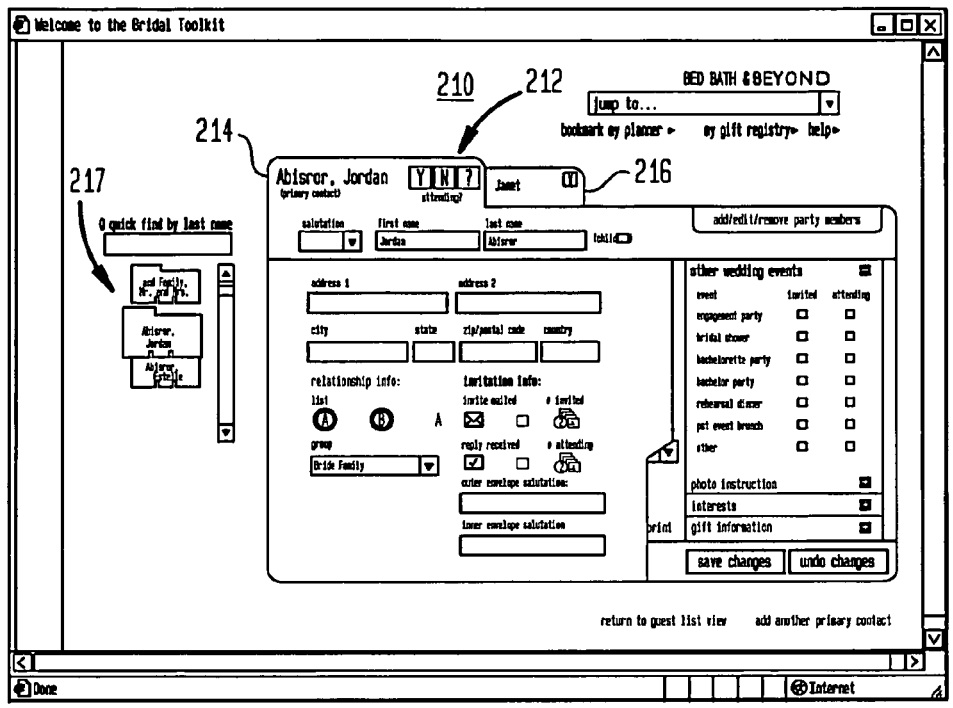

Preferably, the information presented by the guest list manager is generated via guest list manager index card. An exemplary index card 210 is illustrated in FIG. 6B. As a bride or other user adds a primary contact a new index card is preferably generated. The index card 210 maintains contact information including home address, relationship and invitation information.

Checking the Y or N selection 212 as shown at the top of the index card tab 214 indicates a Yes or No response. A bride may also check "?" if they have yet to hear a response from a contact.

On the index card the bride or other user may enter the primary contact address information, whether they are considered to be an "A" or "B" list contact, what group the contact belongs to and whether or not the invitation was mailed and received. The number of attendees is calculated based on the number of secondary contacts added using the add/edit/remove party members. As a new secondary party member is added, their name desirably appears as a sub-tab 216 next to the primary contacts name. And a quick find section 217 enables the user to conveniently scroll through the guest database and select a desired guest. The quick find section 217 preferably has a rolodex-type look and feel.

Optionally, a photograph or other image of the guest may be associated with the index card. The image may be used when making seating arrangements. Furthermore, the image provides the bride and groom an opportunity to visually identify each guest. This may be especially beneficial in identifying long lost relatives or parents' friends.

Figure 6C:
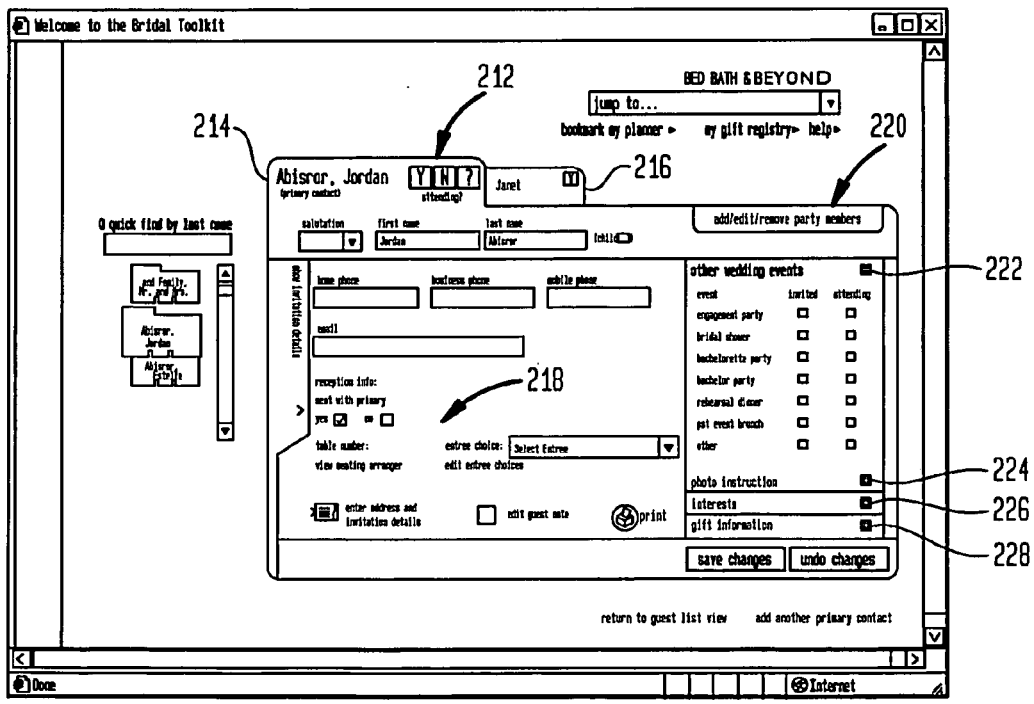

Once the basic contact information is entered, the bride may hide or otherwise minimize display of the address information, as shown in FIG. 6C. In such a case, the bottom "layer" of the index card may visually transform to show more data entry options. Information concerning the reception, such as "seat with primary" (checked if the bride wants to the primary guest to be seated with the secondary guests), table number (populated once the seating arranger is completed) and entree choice may be provided as shown at section 218 the index card. The bride can enter whatever entrees will be served at her reception and track guest's preferences. This is especially useful when dealing with pricing and payment for the reception hall or caterer, as an accurate entree list may be used to negotiate a lower per person cost.

The index card also allows the bride to track additional information about the guest. In a preferred example, area 220 as shown on the right side of the card 214 tracks other events 222 being attended, specific photo instructions 224, interests 226 and gift information 228. Each of these will be explored in detail below.

As shown in FIG. 7A, the "other wedding events" section 222 can be used to track whether or not a guest has been invited and will be attending other related parties and planned events. These include the engagement party, bridal shower, bachelorette party, bachelor party, rehearsal dinner, post event brunch and other. By simply checking the respective box, the index card 214 will track the invites and attendees for the other events.

One of the benefits of tracking wedding-related events is that the bride can generate a listing by event of who is invited and who is attending. This listing may be easily generated in the quick reports section of the application.

As shown in FIG. 7B, the photo instruction 224 area allows the bride or other user to include specific information for the event photographer. This may include which specific shots of the guests are preferred, for instance to let the photographer know that he/she should include photos of the grandmother with bride and groom.

The quick reports section of the application allows the bride to generate a listing of photo instructions that can be printed and handed to the photographer. Alternatively, the photo instructions may be e-mailed or otherwise electronically transmitted to the photographer. Optionally, the photographer may be granted limited access to the application so that he/she will be able to view the photo instructions. Such access may also be preferable as it affords the photographer the opportunity to suggest alternative or additional shots that the bride and groom may want.

As shown in FIG. 7C, the interest area 226 allows a bride or other user to indicate a guest's interests across different categories. By way of example only, the categories of sports, politics, music, literature, cooking and showbiz may be provided as default categories. The user preferably has the ability to add, change or delete categories from the interest area 226. If completed, this data may be used in the seating arranger program, where the application can seat guests together by areas of interest.

In the quick reports section of the application, the bride or other user can generate a report detailing interest by guest.

The gift information area 228, as shown in FIG. 7D, may be used to track gifts by associating a respective gift with a particular event including the shower, the wedding and other. The bride can enter the gift description, date received and whether or not the gift was monetary in nature (or a check or gift card). The gift information area also tracks whether a thank you note has sent, the date mailed and any other comments or note the bride would like to include about the gift received. Optionally, the bride or other user may employ the gift information area 228 to identify gifts given to certain guests, such as to members of the bridal party or the parents of the bride or groom. The data in gift information area 228 may be used by a gift tracker application.

FIG. 8 illustrates an example 230 of the gift tracker application. The gift tracker application allows the bride or other user to quickly review or enter information regarding her gifts. The data is preferably fed from the index cards 214. Alternatively, data may also be keyed directly into the gift tracker screen 230. Optionally, gift-related data may be imported from a separate spreadsheet or database. In the quick reports section of the application, the bride is thus able to generate a listing of gifts received by event, by guest.

As shown in the figure, the specific gift is identified (e.g., a blender, dinnerware set, engraved vase, money). Whether the gift was from the bridal shower or the wedding is also specified. And the gift tracker application may also keep track of whether or not a thank you was sent.

FIG. 9 illustrates an example 240 of the quick reports interface. The quick reports section of the application allows the bride to generate information from various aspects of the application, including the guest list manager, index cards and gift tracker. By clicking on an appropriate box associated with a report name, the bride can send the report to her local printer, e-mail the report or otherwise process the report as desired.

The user has the ability to print guest and contact information for all invited guests. This information may be printed with or without comments. Caterer reports may be generated, for instance with an overall summary or by person. Another type of report that can be generated is the RSVP report, which indicates who has and has not yet replied.

The user may also print reports based on the guests' interests. Here, guests may be organized in the report by common interests. This is particularly useful when it comes to preparing seating arrangements. Similarly, a report may be generated based upon a group list, where guests have been assigned or organized by some group criterion (e.g., family, friends, co-workers, college buddies).

Another useful list include the table list, where the report is generated to show seating arrangements. The user may also select a calligraphy list with guest name, envelope information and/or address. The calligraphy list is useful when generating envelopes, either for printing by the user or for sending to a vendor for printing.

Yet another useful list which may be generated by the quick report interface 240 is the photography list. Here, the user may print out a report showing guests and particular instructions for the photographer or videographer. For instance, the photography report may instruct the photographer and/or videographer to take family pictures three hours before the ceremony, and that different shots should be taken of the immediate family, cousins, grandparents, etc.

The quick reports interface 240 may also be used to generate gift reports based upon the information obtained by or stored in the gift tracker application. And the interface 240 may be used to select from all other wedding events and generate detailed reports based upon those events (e.g., attendees, gifts, date of event, location, etc.)

Figure 16:
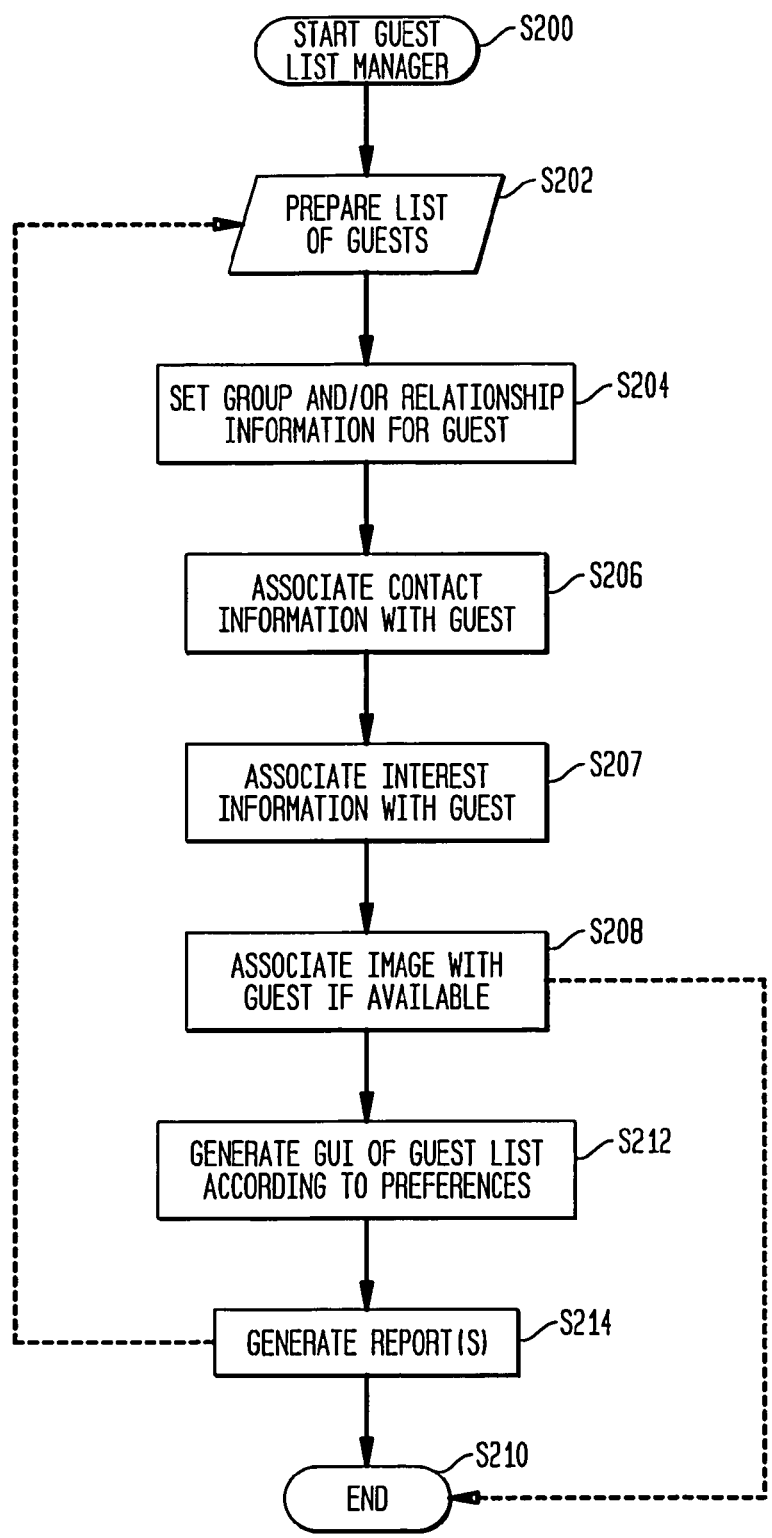
FIG. 16 illustrates another flow diagram in accordance with aspects of the present invention.

FIG. 16 is a flow diagram illustrating certain steps in the guest list management process. The process begins at step S200 when the guest list manager is initiated. As with the task manager referenced above in FIG. 15, the guest list manager may be implemented in any number of ways. For instance, it may be a standalone application or it may be an applet, routine or a program that is initiated by another application in the event planning system.

At step S202 the list of guests is prepared. This may be done by manual entry of some or all of the guests. Alternatively, guest data may be imported from a spreadsheet, database, report or other source. At this point the level of detail for the guest data may be minimal, such as only the guest name, although other information may be provided at this step.

Then at step S204 relevant information about the guest may be added. For instance, as shown in the figure, group information (e.g., member of bridal party) and/or relationship information (e.g., family, friend, co-worker) can be added. As with the basic guest data, the group and relationship information may be entered manually or it may be imported from a spreadsheet, database, report or other source.

And at step S206 guest contact information is also preferably obtained and associated with the respective guest. This data may include home address, e-mail address, etc., and may be imported from a spreadsheet, database, report or other source. Step S207 provides that guest interests may be associated with particular guests. And step S208 shows that if image information is available, it may also be linked with the appropriate guest. While not required, this may be helpful when generating the seating arrangement and seating cards, and is also helpful in identifying guests when meeting them in person.

While steps S204, S206, S207 and S208 are shown as being separate from one another and from step S202, it should be understood that they may be done in any order, including sequentially or in parallel. Steps S204, S206, S207 and S208 may also be performed as part of step S202, or may be performed by a separate process or application.

Once the guest information has been obtained, the process may end at step S210. Alternatively, at this point the guest information may be used in a GUI, for example as shown in FIG. 6A. In the GUI, the user may choose to generate reports in accordance with step S214. Of course, it should be understood that step S214 may be performed as part of step S210. Once the user is done managing the guest information in the GUI, the process may terminate in step S210. Or, in the alternative, the process may return to step S202 for additional preparation of the guest list, for instance if new guests are to be invited.

Figure 10A:
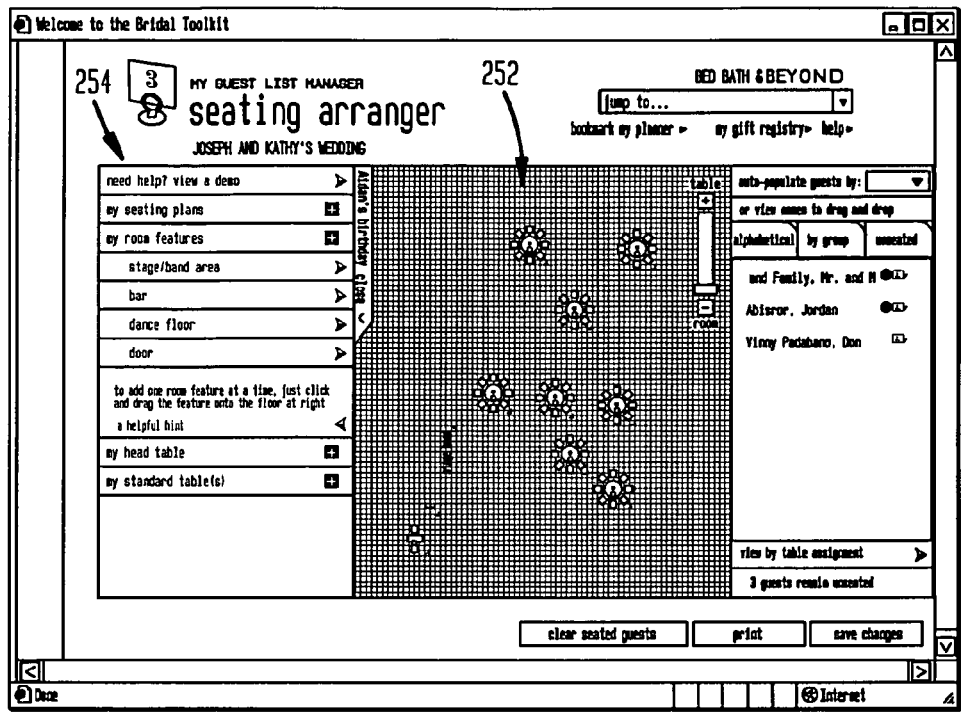
FIGS. 10A-B illustrate a seating arranger application in accordance with aspects of the present invention.

Another important aspect in the system is the seating arrangement feature. FIG. 10A illustrates an example 250 of the seating arrangement application. As shown, the seating arranger application allows a bride or other user to generate a "virtual" reception hall 252 with all of the attributes she would find in her real location. The virtual reception hall 252 is preferably part of an interactive GUI. For instance, tables, doors, bar, band and dance floors can all be added to the seating arranger to make it as realistic as possible. The bride or other user may change the location of the various objects in the room. She may also zoom in and out of different portions of the room.

The seating arranger integrates preferably tightly with the guest list manager. In one aspect of the invention, if a bride chooses not to use the guest list manager, then the seating arranger may not be enabled. The primary and secondary contact information from the index card populates the right hand side of the seating arranger screen 250. Preferably, a guest will not appear in the seating arranger unless they indicated that they are attending.

Optionally, if the guest is listed as possibly attending, the seating arranger may either place the guest in a seat with or without an indicator that the person may not attend. Alternatively, the guest may not be assigned a seat. In this case, the guest may be flagged to notify the user that if the person does attend, alternative seating arrangements will be necessary.

Once a contact is in the guest list area of the seating arranger, a bride or other user can drag and drop one or more guests from the list onto any table they have placed on their virtual floor. Occupied seats are preferably shown differently than unoccupied seats (such as by showing someone sitting in the chair). In one alternative, if the guest's image has been associated with his or her index card, the image may be used to represent the guest at a given table of the seating arranger.

Tables may be added in the seating arranger screen 250 via the left hand control area 254. A bride may begin by selecting her head table (if there is going to be a "dais") and then selects the "standard" tables. These tables represent the tables the guests will be seated at. Alternatively, the bride may begin by seating members of the bridal party and/or other guests as desired.

Figure 10B:
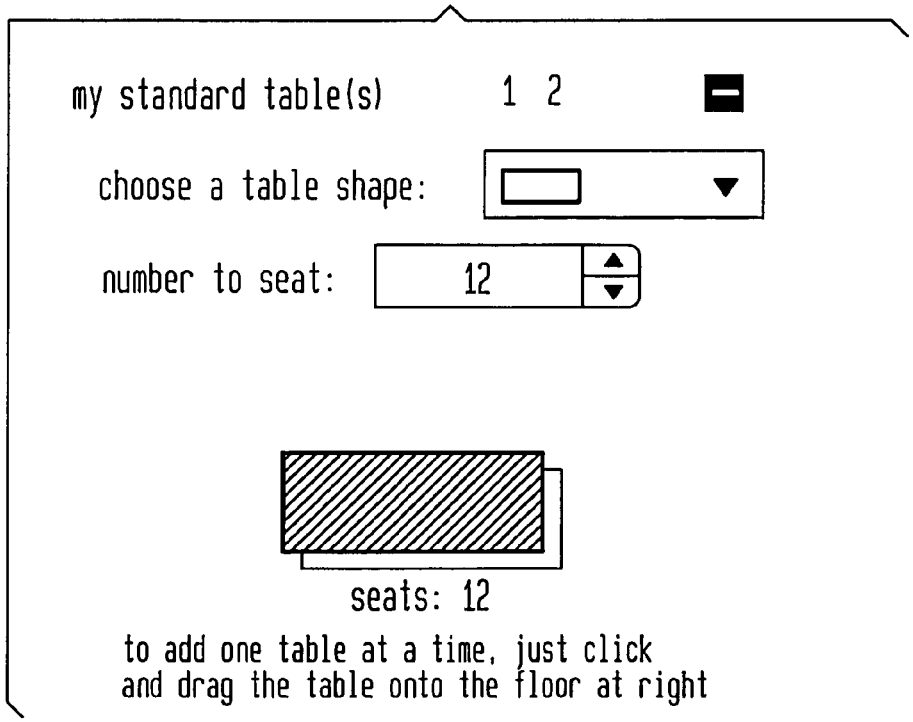

The bride may choose the shape of the table (circle, square, rectangle or oval) and then indicates how many guests will be seated per table, as shown in FIG. 10B. Dragging and dropping the table to virtual floor will allow the bride to start adding guests to the table.

The bride has several options available to add the tables to the virtual floor. She can have the application auto-populate her tables. Auto populate will add the appropriate number of tables based on the guests in the guest list area of the seating arranger. The bride may then drag and drop her guests to the auto populated tables.

The bride can also populate the seating layout using a variety of alternatives. For instance, she may opt for a randomized arrangement, to seat people by group, and/or to seat people based on their interests. The randomize option allows the application to automatically seat people wherever it randomly places them. For example, a random number generator may assign numbers to each individual guest. Then each table may be filled by sequentially filling in the numbered guests. For instance, if the first table has 10 seats, then the guests who have been randomly assigned numbers 1-10 will be seated at the first table. In one alternative, once the seating method has been chosen, then that is the method used to seat guests. In this case, if additional guests are added afterwards, they may be added manually. In a further alternative, the system may generate multiple seating layouts. The user may save the various layouts, e.g., three versions or more, and may subsequently select one of these layouts to use.

In another example, the seat by group option keeps any primary and secondary contacts (who selected "seat together" on their index card) together. Thus, spouses and/or children may be seated together. Alternatively, co-workers, friends or extended family members that have been identified as belonging to a given group may be seated together. The seat by interest option access the interest data from the index cards and seats guests with like-kind or complementary interests together at the same tables. In one example, the seat by group option is a higher priority than the seat by interest option. Thus, the application will first populate tables based on the seat by group option and will then fill in remaining seats using the group by interest option. Should additional guests need to be seated at this point, any other method may be used to seat them, including the randomize option or by manual placement.

Yet another alternative is to assign table placement based upon room layout. For instance, if there are bridal party and/or family tables, those tables may be placed nearest the table of the bride and groom. A table including people whose interests include dancing may be located near the dance floor. And the application may place a table including hearing-impaired guests far from the speakers or the band.

If a table is deleted, the people at the table are added back into the guest list area. Preferably, if the user places the cursor over a table so that it hovers there, the names of the people at the table may appear. And if the cursor hovers over a seat, the name and/or image of the person assigned to the seat may appear.

Figure 17:
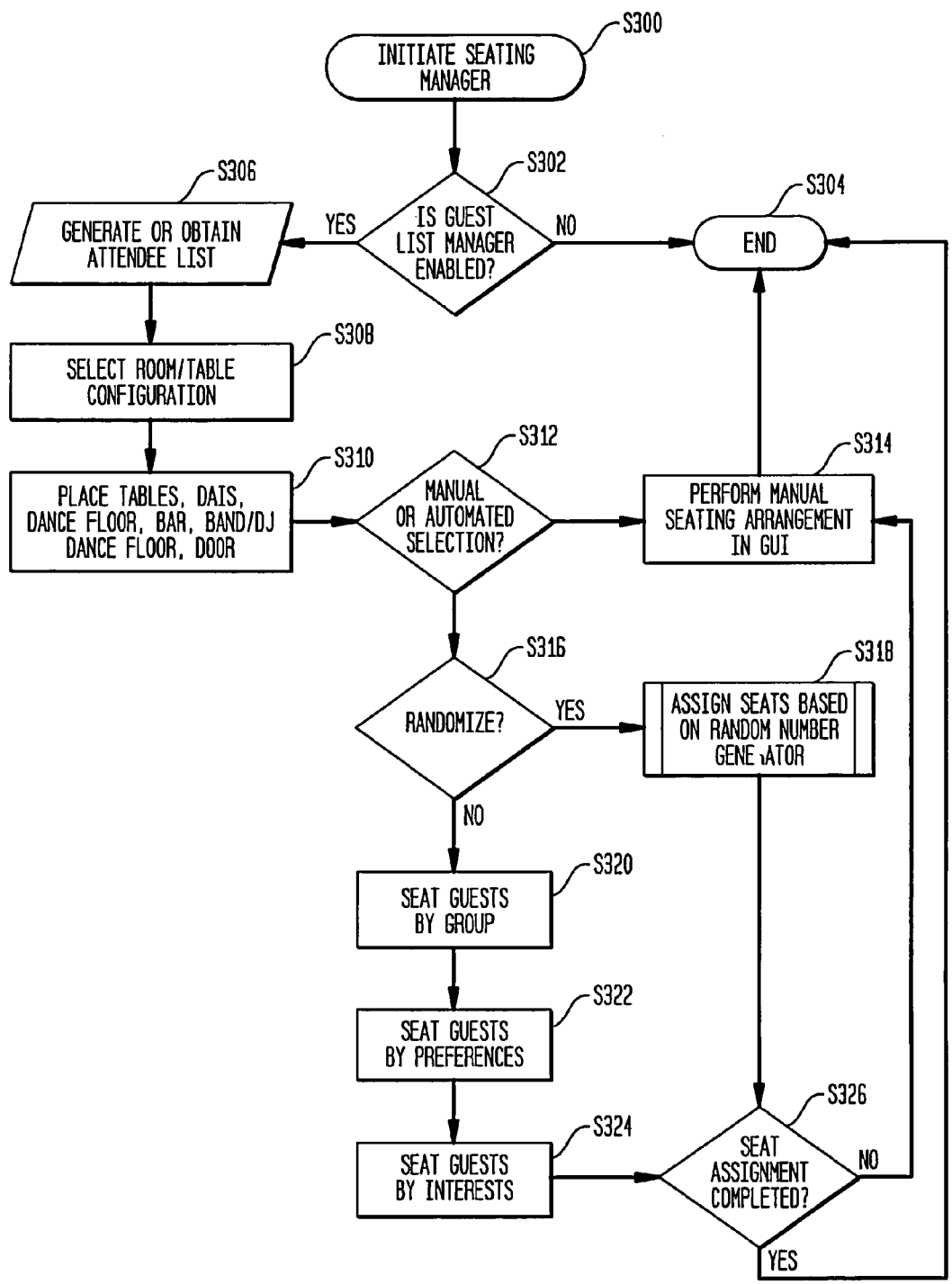
FIG. 17 illustrates a further flow diagram in accordance with aspects of the present invention.

FIG. 17 is a flow diagram illustrating a seating arrangement process in accordance with the invention. In this exemplary process, the seating selection begins at step S300 when the seating manager is initiated. The seating manager may be implemented in any number of ways. For instance, it may be a standalone application or it may be an applet, routine or a program that is initiated by another application in the event planning system, for instance the guest list manager.

Next, at step S302, it may be determined whether the guest list manager application is enabled. In this case, if the guest list manager is not enabled, the seating process may terminate at step S304. And if the guest list manager is enabled, the process preferably proceeds to step S306, where a guest attendee list is generated or obtained. For instance, the seating manager may obtain a list of all guests that have indicated that they are attending from the guest list manager.

Next, the bride or other user of the seating manager may use the user interface/GUI to select a room and table configuration as shown at step S308. Once the general configuration of the room and number of tables are identified, specific components of the virtual reception hall may be positioned as desired at step S310.

After the layout of the virtual reception hall is set, the user may choose perform seating selection in a manual mode or an automated mode as shown at step S312. If manual mode is chosen, then at step S314 the user selects individual guests from a list on the user interface and places them in specific seats as desired. Upon completion, the process ends at step S304.

If manual mode is not chosen, then the application determines (e.g., based on user selection or a predetermined factor) what type of automated seating process should be performed at step S316. One choice is to use the randomize feature, whereby individual guests are randomly placed in seats as per step S318, e.g. using a random number generator to assign seats.

If randomization is not used, then the process proceeds to step S320. Here, the guests are preferably seated in accordance with group information associated with the guests as stored in the guest list manager. For guests without group information, the process desirably proceeds to step S322, wherein remaining guests are seated based upon their preferences from the guest list manager, if any. For remaining unseated guests, the process preferably proceeds to step S324, where seating is performed by the seating manager based upon interests. Of course, it should be understood that steps S320, S322 and S324 are listed in a given order but may be performed in any order or concurrently.

At this point, the process proceeds to step S326 to see if any guests remain unseated. If so, the process may proceeds to either step S318 for randomized seating of such guests, or to manual seating in accordance with step S314. Once all guests are seated the process terminates at step S304.

Optionally, at any point in the seating processes, even after completion of seating, the user may return to any of step S308-S324 to generate a different seating arrangement or layout.

Figure 11A:
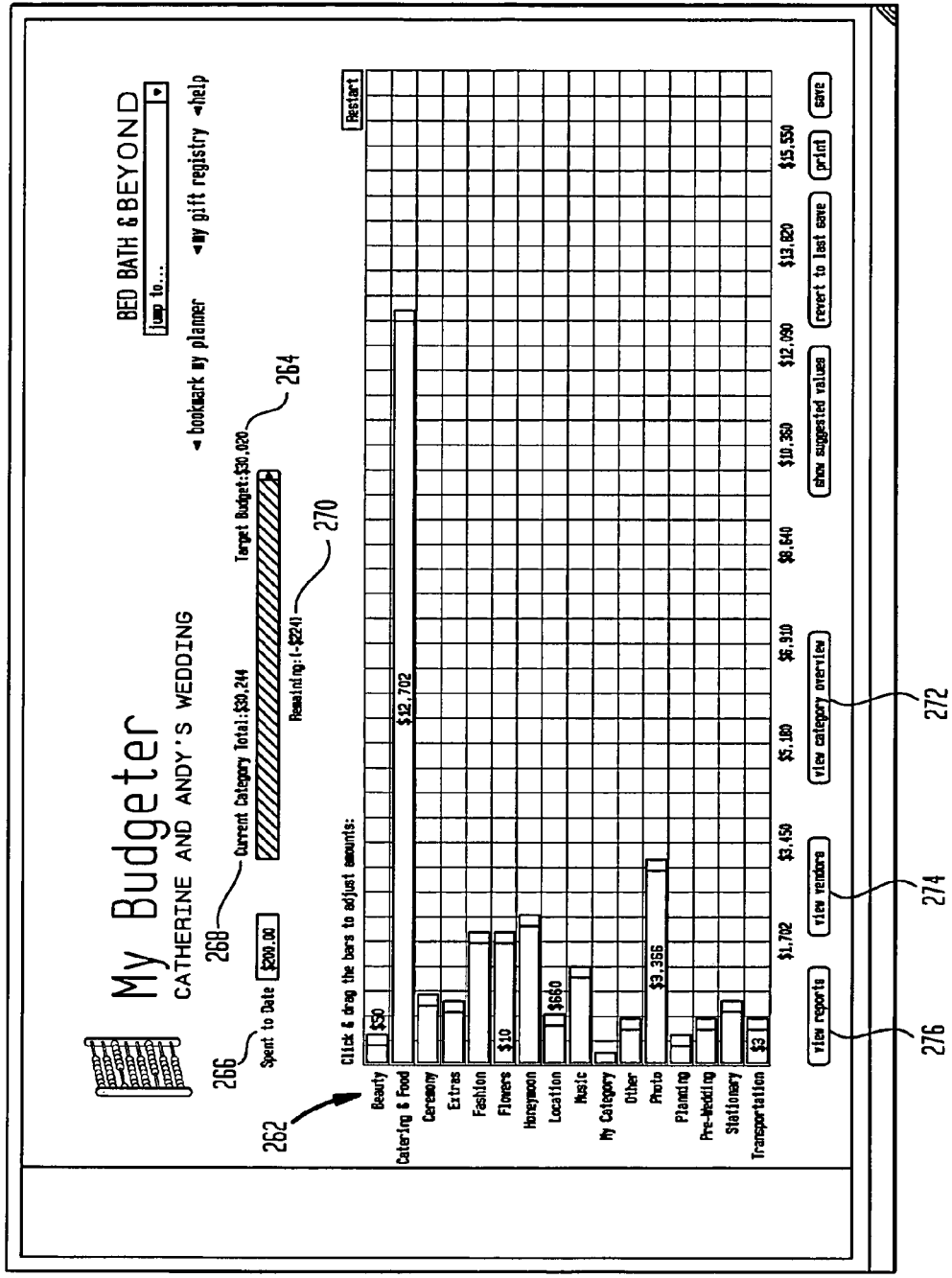
FIGS. 11A-D illustrate a budgeting application in accordance with aspects of the present invention.

FIG. 11A illustrates an example 260 of a preferred interface for the budgeter application. The budgeter provides the bride or other user the ability to track all expenses pertaining to the wedding or other event. For instance, as shown in this figure, section 262 desirably breaks down costs on a category by category basis. This may include, for instance, beauty, catering & food, ceremony, extras, fashion, flowers, honeymoon, location, music, photos, planning, pre-wedding, stationary, transportation, etc. The user may select any given category and adjust the expected or actual amount spent.

The user preferably also sets a target budget 264. The target budget 264 may be adjusted from time to time to reflect choices made in planning the wedding. The budgeter preferably also provides a "spent to date" indicator 266, a "current category total" indicator 268 and a remaining indicator 270.

Thus the exact costs and any spending cushion may be determined for each event category as well as for the overall event. By way of example only, the catering & food category may have a budget of $12,702. This may be based on a number of factors which are tracked by the toolkit system. For instance, in one example, the guest list manager may track the number of guests who have responded that they will attend as well as the entree that they have chosen. As different entrees may have different costs, the budget for catering & food may need to change depending on what the guests choose to eat. Alternatively, the entree costs may be manually calculated and entered into the budgeter.

In this example, the various indicators help to alert the user to how realistic the budget is for the given category. For instance, if the budget has been set to $12,702 for catering & food, then the "current category total" indicator 268 will show $12,702. And if the spent to date indicator 266 shows that $10,000 has already been spent, then the remaining indicator 270 will show a value of $2,702. This remaining value may be due to the fact that additional payments are due to the caterer, or it may mean that fewer guests can attend than originally planned, resulting in a lower overall cost. In the latter case, the extra $2,702 may be reallocated to one or more other categories as needed, or the overall target budget 264 may be reduced by that amount. The extra money is preferably reallocated by the user.

The budgeter application permits the bride or other user to access details about a given category through the "view category" selector 272. She may access details about the vendor (s) for a given category through the "view vendors" selector 274. And the bride or other user is able to generate reports for any given category or for budgeting of the overall event. For instance, she may select the "view reports" selector 276 to generate a desired report.

Figure 11B:
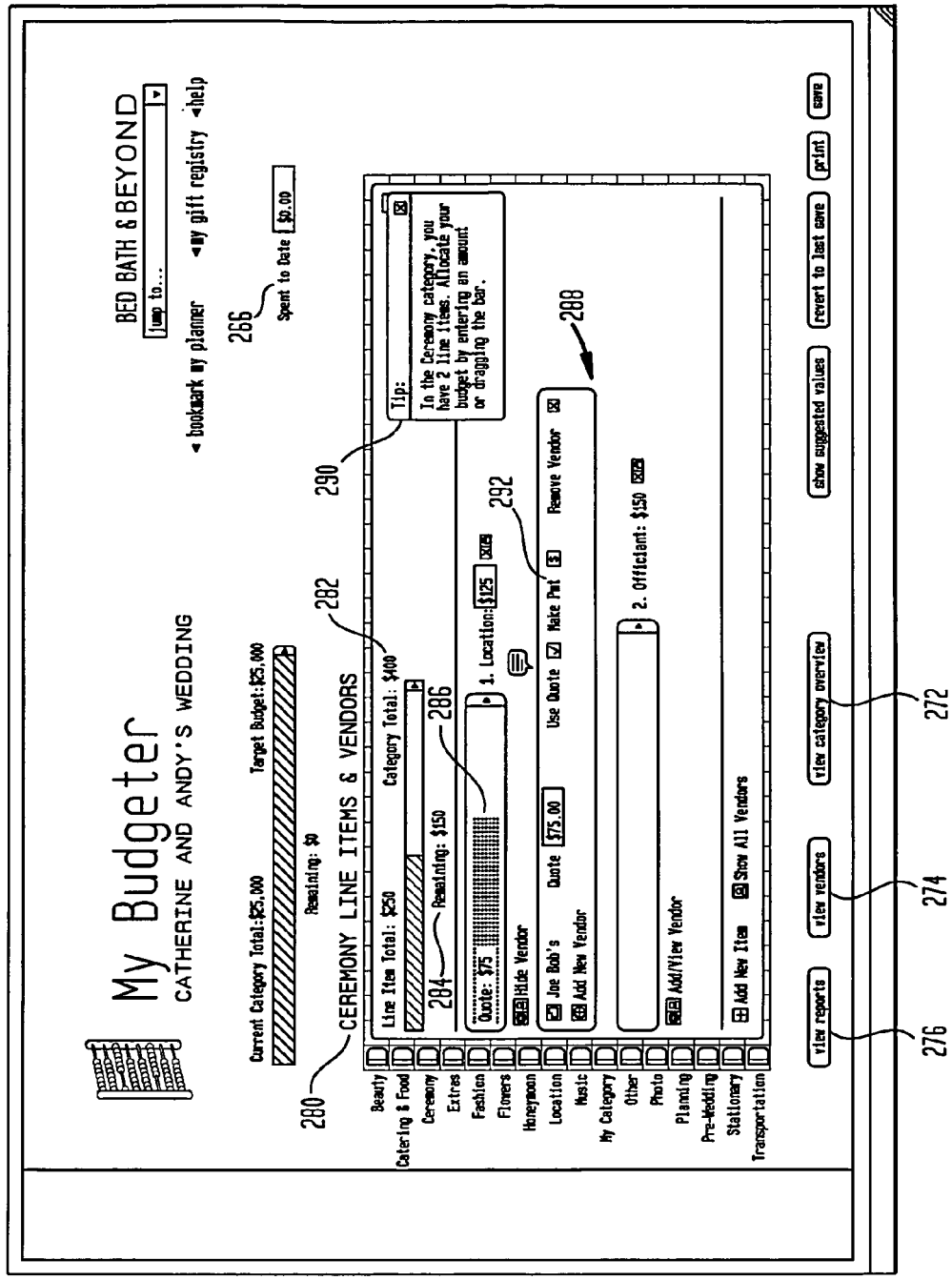

If the user wants to see the details for a category such as the ceremony, once she actuates the view category selector 272 a new page or screen is preferably provided. FIG. 11B shows an exemplary screen 278 for details on the ceremony. As in the screen 260, the target budget 264, spent to date indicator 266, current category total indicator 268 and remaining indicator 270 may be shown here.

The details on the category are preferably broken out by line items, which may reflect individual vendors, payments, points in time, etc. In the example shown in FIG. 11B, there is preferably a line item total 280, a category total 282 and a remaining amount 284. Information about the current line item may be provided in the quote section 286 and in the vendor section 288. The amount paid or due to each vendor can be input, changed and/or viewed here. An existing vendor may be removed and new vendors may be added. And as shown in box 290, a tip may be provided about the current category.

Returning to the vendor section 288, selector 292 provides the user with the option to make a payment to the vendor. If the user decides to pay the vendor, the budgeter application may use a conventional direct deposit process to make the payment. Alternatively, the budgeter application may use a conventional check generation process to issue a check that the user may send to the vendor.

Figure 11C:
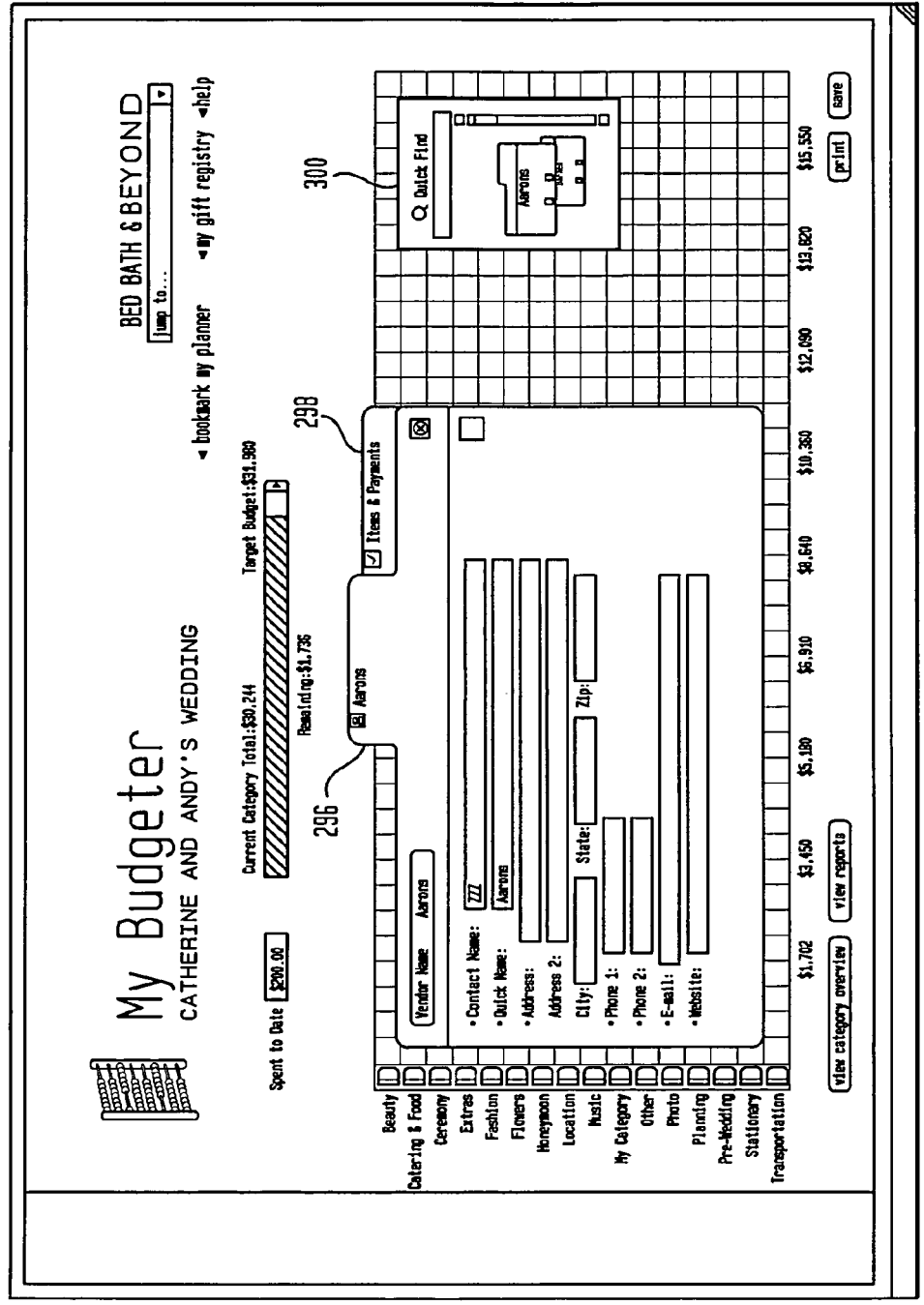

The user may access details about the vendor with the view vendors selector 274. In this case, a new screen or page 294 may be provided to the user, as shown in FIG. 11C. As shown, a "vendor card" appears, which includes the vendor's name, address and other contact information. This contact information may be provided on a first card 296, while information about details and payments may be provided on a second card 298. A quick find section 300 preferably is used to provide easy access to any of the vendors for the particular category and/or for the overall event.

Figure 11D:
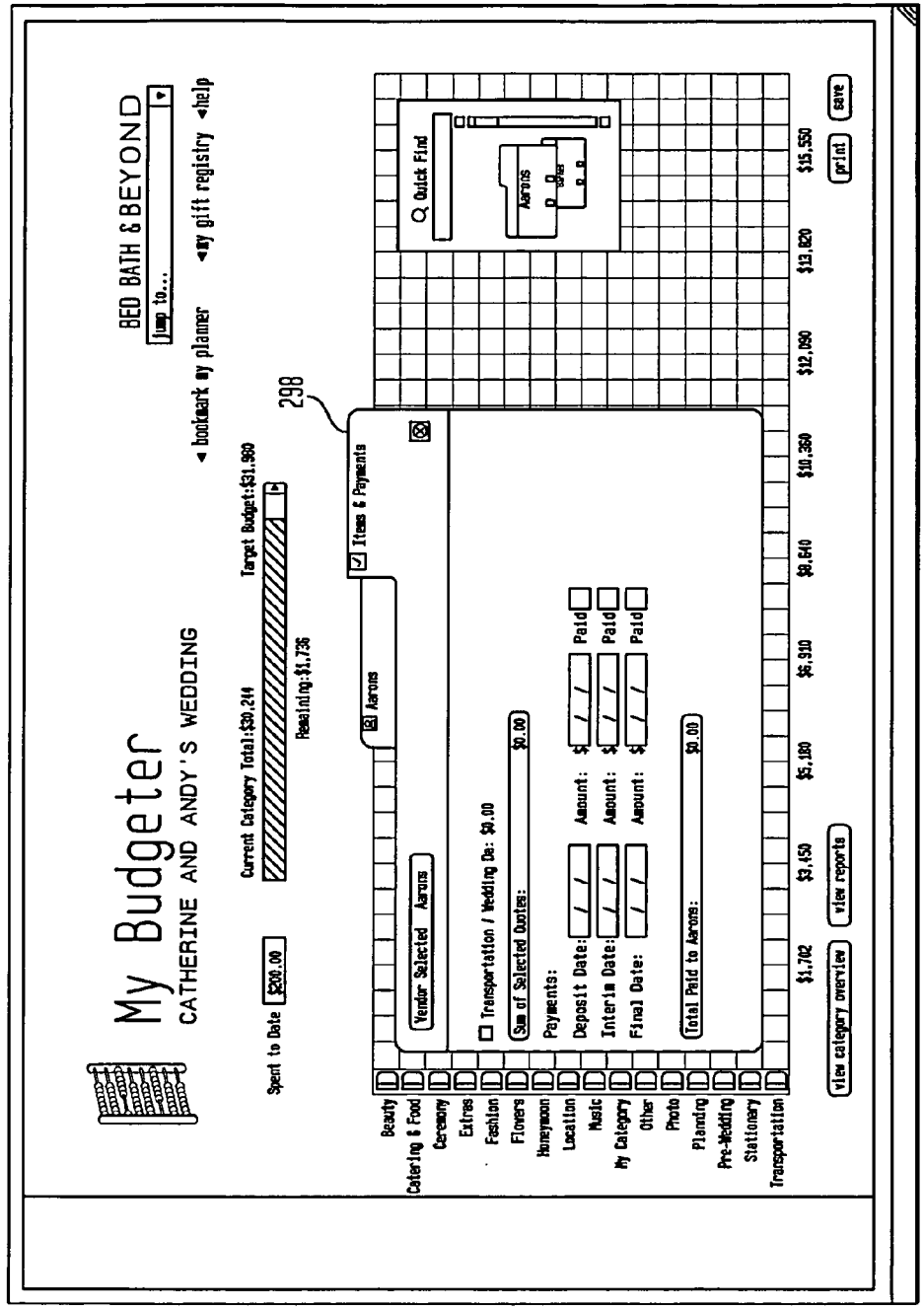

As shown in FIG. 11D, the card 298 provides specifics on payments owed and/or paid to the given vendor. Other details about this vendor may also be shown here. For instance, if the vendor were a florist, the card 298 may indicate what types of flower arrangements and/or corsages will be provided.

Various types of reports may be generated by the budgeter application. As shown on page 302 of FIG. 12A, different categories may be selected and the overall budgeting for those categories may be calculated. The page 302 preferably provides different "cards" or levels of information. For instance, the page 302 preferably includes a category budget overview section 304, a vendor payment overview section 306, and a vendor overview section 308.

Thus, the bride or other user may choose a subset of categories and use the budgeter application to quickly and easily show her the planned cost for each category and/or vendor, how much has been spent to date, whether that category and/or vendor is currently over or under budget, and the target budget for that subset of categories and/or vendors.

Figure 12A:
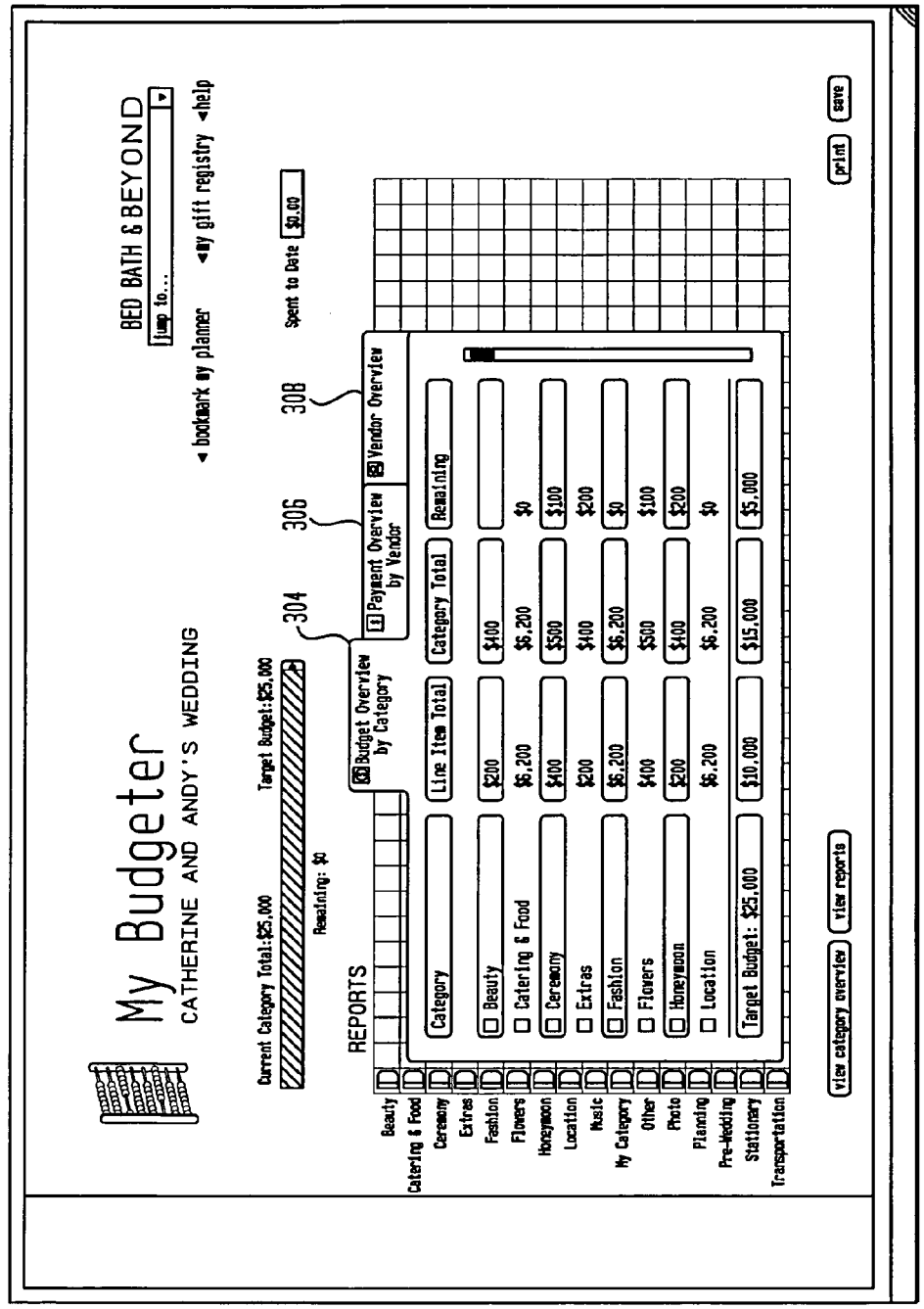
FIGS. 12A-C illustrate features of the budgeting application of FIGS. 11A-C.
Figure 12B:
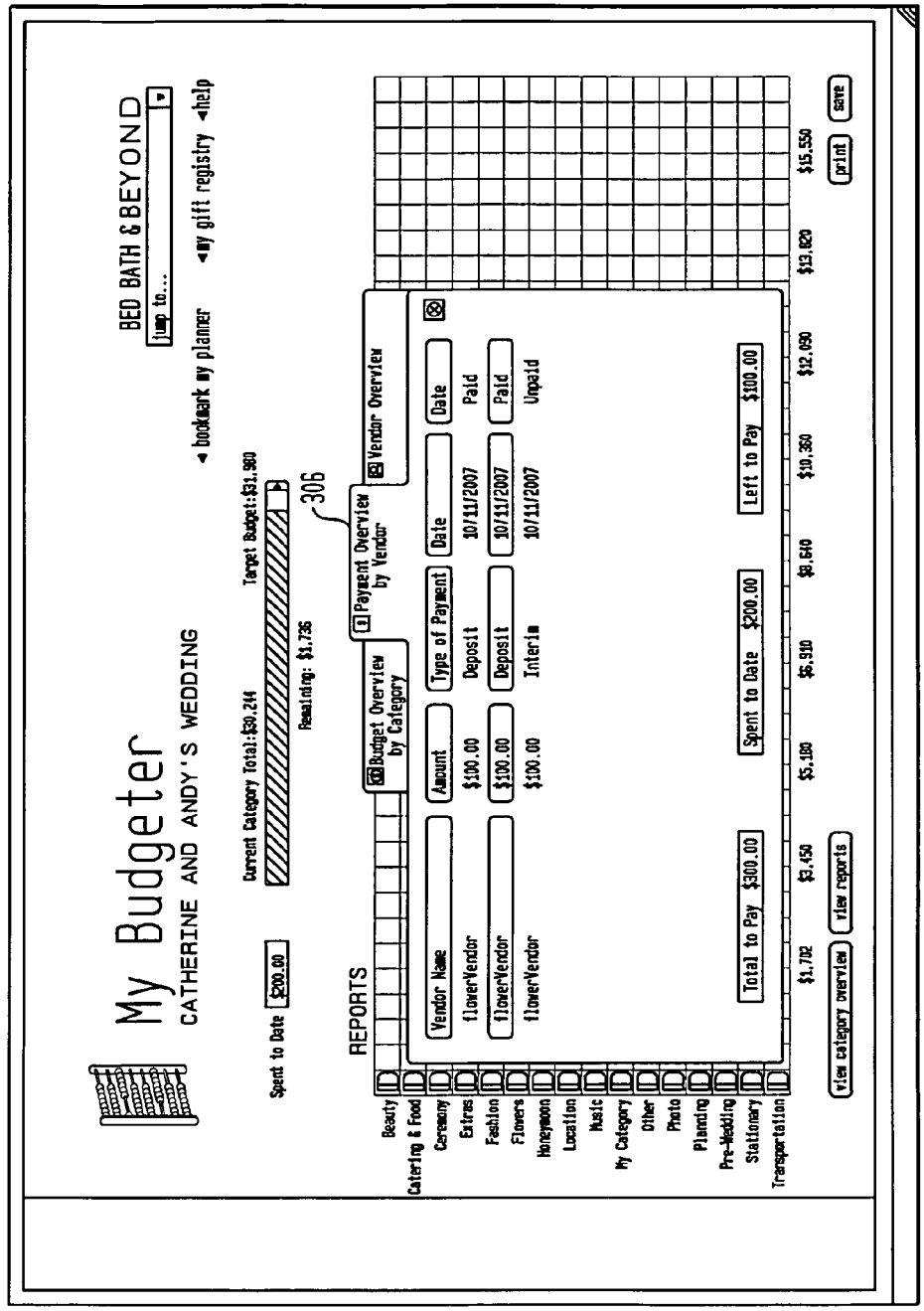
Figure 12C:
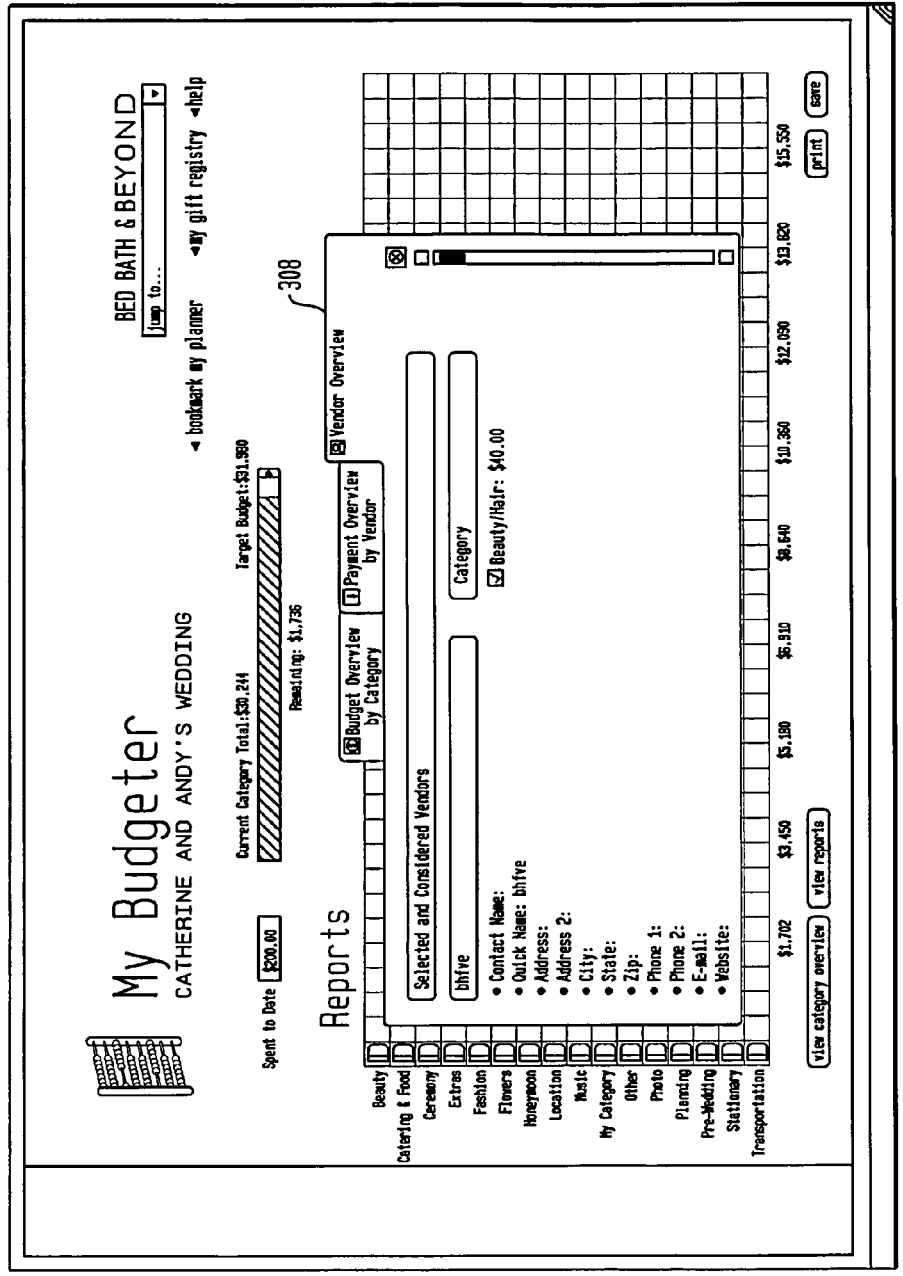

FIG. 12B illustrates details of the vendor payment overview section 306, and FIG. 12C illustrates details of the vendor overview section 308. The various subsections of the reports page are linked with the other sections of the budgeter application. Thus, as shown in FIG. 12B, the vendor payment overview section 306 is configured to list all vendors for a given category, the amounts owed or paid to those vendors, the type(s) of payment, the date(s) of payment, and whether they have in fact been paid. And as shown in FIG. 12C, the vendor overview section 308 preferably includes contact information for the vendor(s), as well as the amount budgeted for the respective vendor.

Thus, it can be seen that the budgeter application can be a useful and important application for the bride or other user of the overall event planning toolkit. The budgeter application provides current and accurate information concerning the state of the event. The bride can view current and anticipated expenses and plan accordingly.

For instance, as shown in FIG. 12A, while the overall subset of categories may be over (or under) budget, the user may readily determine if any particular categories are under (or over) budget. This will permit her to reallocate funds between categories, to plan for an increase to the overall budget, or to reduce the overall budget if the categories are coming in under the expected cost. And as shown in FIGS. 12B and C, the bride may track expenses for different vendors, including vendors that have merely submitted bids or vendors that are under contract to provide the needed services. Thus, the budgeter is a powerful tool that not only allows the bride or other user to get a handle on costs, but it also gives the bride peace of mind to know where things stand with the wedding planning. It is possible for information from the budgeter to flow to other aspects of the event planning toolkit to provide a seamless suite of applications. Alternatively, the budgeter operates as a stand alone application in which information does not automatically flow to other event planning applications.

Figure 13:
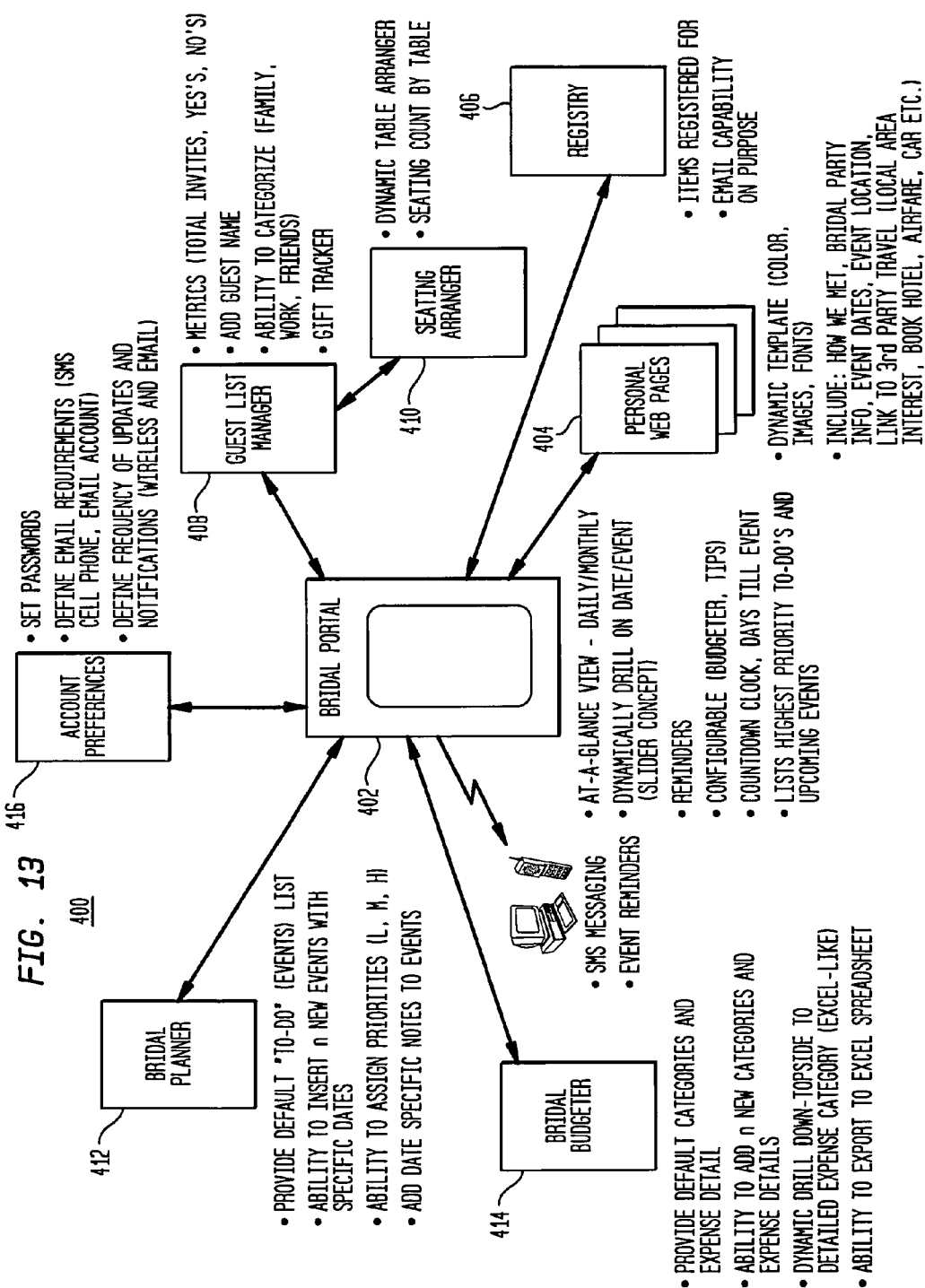
FIG. 13 illustrates an application level view of the event planning system in accordance with aspects of the present invention.

A logical representation 400 of the overall event planning system is shown in FIG. 13. It represents a combination functional and flow diagram of a preferred system and method in accordance with the current invention.

As shown in this figure, the main entry point to the system is "portal" 402. The portal 402 can be used to provide an overall view of the planned event through the welcome section 122 of FIG. 2. For instance, the bride or other user may be provided a daily or monthly snapshot. Timelines may be used in the snapshot, and as explained above with regard to FIGS. 5A and 5B, reminders and details of specific tasks may be given.

The various applications of the event planning system may be accessed through the portal 402. For instance, personal web pages 404 may be accessed here These web pages 404 may include the bride page 124, the groom page 126, the "our story" page 128, the "our wedding day" page 130, the "other events" page 132, the "where to stay" page 134, the "travel" page 136 and the "wedding party" page 138.

The portal 402 also provides the guest or other user with access to the bride's registry. As noted above with regard to FIG. 3B, the user may select the "our gift registry" link 152 to access the registry. The gift tracker application 230 preferably accesses the registry information and the information may be associated with a given guest and saved as shown in FIG. 7D. Thus, not only can the event planning system keep track of what has been registered for, but it can also keep track of what has been purchased, what it has been purchased for, and whether it has been shipped to the guest or the bride. This may be done via a purchase notification, which may issue as an e-mail, instant message, etc.

Another application accessible via the portal 402 is guest list manager 408. As explained above, the guest list manager stores metrics such as the total number of invitees, the number of guests who have responded yes and no, etc. The guest list manager links to the gift registry application for linking guests with gifts. Furthermore, it provides the ability to store the interests of the guests. Thus, as the guest list manager 408 links to seating arranger 410, the interest information may be used when performing dynamic seating allocation. In addition, the seating arranger 410 gives the bride or other user many other options for planning and laying out the seating for the wedding or other function, as discussed in detail above. The seating arranger may be directly accessed through portal 402 or indirectly accessed via guest list manager 408 or another application of the event planning system.

The portal 402 also provides access to bridal planner 412. And as explained above, the bridal planner 412 enables the bride or other user to create, modify and/or delete various tasks associated with the wedding. The tasks may be prioritized by date or importance. And the tasks may be illustrated with the timeline feature.

Furthermore, the portal 402 provides access to budgeter application 414. The budgeter provides detailed expense information that is a very important factor in any wedding or similar event. As explained above, the bride or other user has the ability to track expenses, associate expenses with vendors, generate reports for different categories of events or tasks, and use all of this information to smoothly schedule the wedding.

The portal 402 may also provides access to other functionality. By way of example only, an account management application 416 is preferably available to the bride or other user. In certain cases it may be useful for the user to provide access to some or all of the application suite, for instance setting passwords and levels of authority to view, create, modify and/or delete data from the databases. Thus, the user may delegate certain activities to other people. Notification information may also be set through the account management application 416. By way of example only, notifications may be done via e-mail, which can be set up to be sent to handheld devices such as cellular phones via an SMS or other protocol. The frequency of updates may also be selected. Thus, the user may choose that the bride be notified via e-mail on her cell phone every time a guest responds that they will be attending the wedding. Alternatively, the user may select notification when a vendor submits an invoice or requests payment for a task.

It should be understood that the functions associated with each block identified in FIG. 13 and explained herein may be performed by a one or more computers, where each computer contains a processor, memory and other components typically present in general purpose computers. The memory stores information accessible by the processor, including instructions for execution by the processor and data which is retrieved, manipulated or stored by the processor. The memory may be of any type capable of storing information accessible by the processor, such as a hard-drive, ROM, RAM, CD-ROM, write-capable, read-only, or the like.

The instructions may comprise any set of instructions to be executed directly (such as machine code) or indirectly (such as scripts) by the processor. In that regard, the terms "instructions," "steps" and "programs" may be used interchangeably herein. The functions, methods and routines of the program in accordance with the present invention are explained in more detail above. The invention is not limited to any particular computer language or code. And the instructions may be implemented as firmware in the processor or as part of an ASIC.

Data may be retrieved, stored or modified by the processor in accordance with the instructions. The data may be stored as a collection of data. For instance, although the invention is not limited by any particular data structure, the data may be stored in computer registers, in a relational database as a table having a plurality of different fields and records, or as XML. The data may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

Although a single processor and memory may be used to execute the functions, it will be understood by those of ordinary skill in the art that the processor and memory may actually comprise multiple processors and memories that may or may not be stored within the same physical housing. For example, some or all of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

Thus, while in some embodiments a single processor may perform all the functions described herein, including task management, timeline management, budget management, guest list management, seating management, personalized web page management, registry linking and overall planning, in other embodiments the various management, linking and planning functions may be distributed among multiple processor and/or sub-processors.

Figure 14:
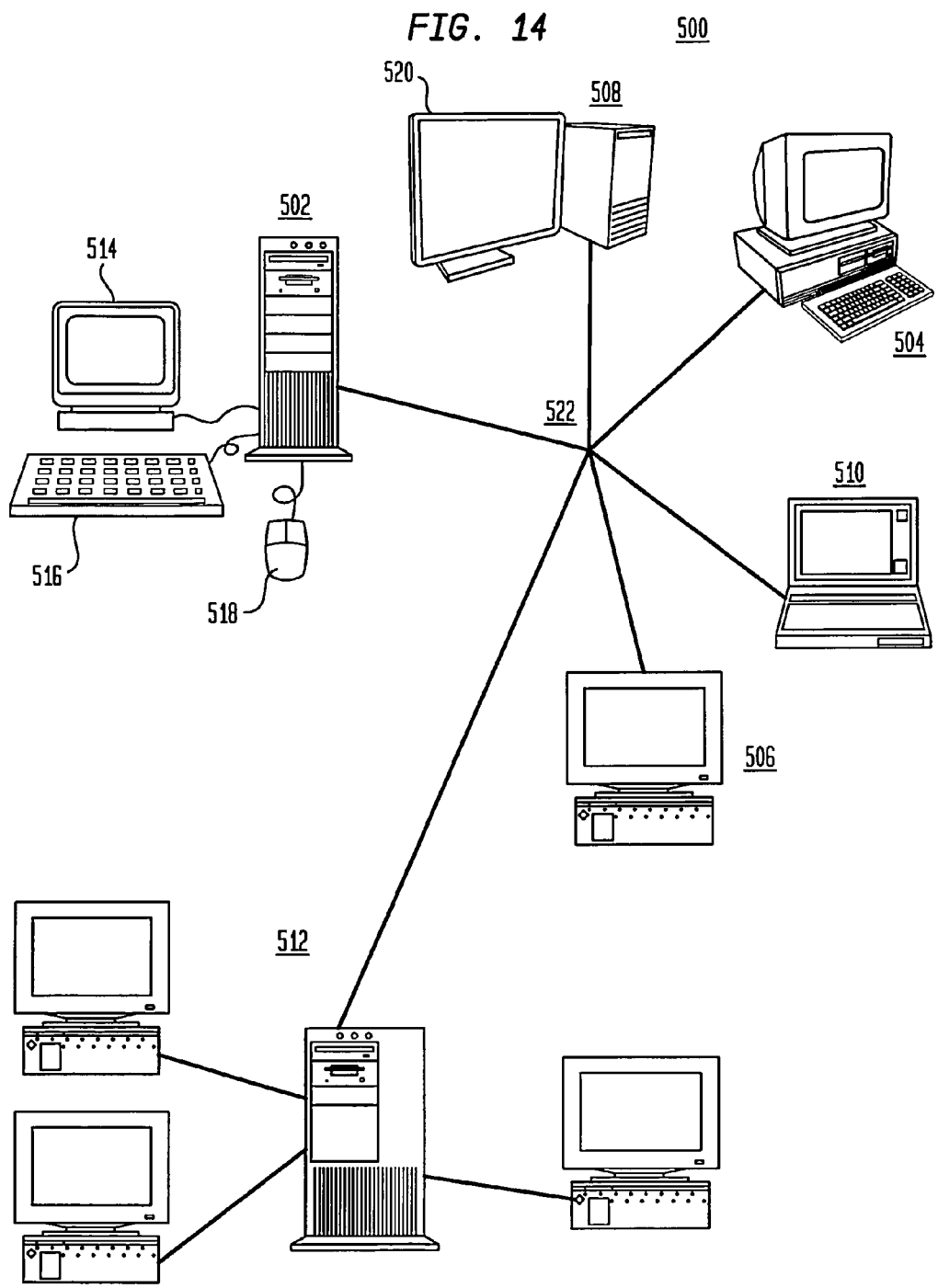
FIG. 14 illustrates a computing network architecture in accordance with aspects of the present invention.

FIG. 14 is an exemplary computer network 500 which may be used in accordance with the invention. As shown, it may comprise a number of computing devices such as desktop computers 502, 504 and 506, kiosk 508, laptop 510 and/or server 512.

Any of these computers may comprise additional components typically found in a computer system such as a display (e.g., an LCD screen) 514, user input (e.g., a keyboard 516, mouse 518, game pad, touch-sensitive screen 520), microphone, and the like. Network 522 may be accessed using a variety of communication devices (e.g., landline telephone dial-up, cable modem, Ethernet connection, wireless LAN or WAN connection, Bluetooth, wireless telephone messaging network), and all of the components used for connecting these elements to one another.

The invention is particularly advantageous when used with multiple end user computers, e.g., multiple end user computers in communication with a web server over the Internet. Although a typical web server may be used such as server 512, any computer network server or other automated system capable of communicating with other computers over a network, any automated system capable of communicating with other computers over a network, including the Internet, wide area networks or local area networks, may suffice.

With respect to the methods described herein, it should be understood that the operations do not have to be performed in the precise order described above. Rather, various steps can be handled in reverse order, non-sequential order, or simultaneously.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

By way of example only, while different embodiments described above illustrate specific features, it is within the scope of the present invention to combine or interchange different features among the various embodiments to create other variants. Any of the features in any of the embodiments can be combined or interchanged with any other features in any of the other embodiments. While certain processes have been shown in a particular order, it is to be understood that unless expressly stated the order may be varied and/or performed concurrently.

The invention claimed is:

1. A system for event planning, the system comprising:
   a portal operable, using a processor, to obtain a list of guests for a first planned event and to access a gift registry operable to record a list of gifts;
   a guest list manager operable to manage the list of guests for the first planned event, and to track whether each guest is also an invitee to a second planned event related to the first planned event;
   a guest list database operable to associate guest-related information with respective ones of the guests, and to associate event-related information with one or more of the first planned event and the second planned event;
   a gift tracker operable to manage the list of gifts, to associate each gift in the list of gifts with at least one of the first planned event or the second planned event, and to associate respective gifts in the list of gifts with respective guests;
   a task manager operable to generate a series of predefined tasks pertaining to at least one of the first planned event or the second planned event, to modify one or more of the predefined tasks and to add new tasks in response to user input, and to rank selected ones of the predefined and new tasks based upon a ranking criteria;
   a timeline manager operable to obtain the predefined and new tasks from the task manager, and to receive a timeframe boundary from the task manager or from user input, and
   a graphical user interface generator operable to display a timeline according to the timeframe boundary, the timeline identifying at least some of the predefined and new tasks falling within the timeframe boundary,
   wherein a higher priority task is more prominently displayed on the user display along the timeline than a lower priority task and wherein a set of highest priority tasks are simultaneously displayed on the user display separately from the timeline, and
   the graphical user interface generator is operable to generate a report in association with the gift tracker, the report identifying each gift in the list of gifts, whether that gift is associated with the first planned event, and whether that gift is associated with the second planned event.

2. The system of claim 1, further comprising a budget manager operable to set an expense budget for at least one of the first planned event or the second planned event.

3. The system of claim 2, wherein the budget manager is further operable to associate a vendor with a line item expense for a given task.

4. The system of claim 1, wherein the task manager is further operable to associate a virtual sticky note with a given task, and the timeline manager is further operable to display the virtual sticky note on the user display when the given task is displayed on the timeline.

5. The system of claim 1, wherein the first planned event is a wedding, a first one of the predefined tasks is procuring a wedding gown, and the wedding gown task is one of the highest priority tasks.

6. The system for event planning according to claim 1, wherein the report generated by the graphical user interface generator further identifies, for each guest in the list of guests, whether at least one of the gifts in the list of gifts is associated with that guest.

7. The system for event planning according to claim 6, wherein the report generated by the graphical user interface generator further identifies whether the at least one gift associated with a respective guest has been purchased by that guest.

8. The system for event planning according to claim 6, wherein the report generated by the graphical user interface generator further identifies whether the at least one gift associated with a respective guest has been shipped to that guest.

9. The system for event planning according to claim 1, wherein the graphical user interface generated by the graphical user interface generator enables the report to be transmitted to a printer.

10. The system for event planning according to claim 1, wherein the graphical user interface generated by the graphical user interface generator enables the report to be transmitted via email.

11. A system for event planning, the system comprising:
    a guest list manager operable, using a processor, to prepare a list of guests for a first planned event, group information for selected ones of the guests, contact information for respective ones of the guests, and interest information for certain ones of the guests, and to track whether each guest is also an invitee to a second planned event related to the first planned event;
    a guest list database operable to associate the group, contact, and interest information with specific ones of the guests, and to associate event-related information with one or more of the first planned event and the second planned event;
    a gift registry operable to record a list of gifts;
    a gift tracker operable to manage the list of gifts, to associate each gift in the list of gifts with at least one of the first planned event or the second planned event, and to associate respective ones of the list of gifts with respective guests;
    a graphical user interface generator operable to generate a graphical interface of the guest list and, for a respective guest, each gift associated with that guest and whether that gift is associated with the first planned event or the second planned event for displaying to a user on a display; and
    a seating manager operable to obtain a list of attendees to at least one of the first planned event or the second planned event from the guest list manager, the list of attendees being a subset of the guest list, the seating manager being further operable to generate a virtual event configuration for that event on the display in response to user input, the configuration including seating for at least some of the attendees on the list of attendees to that event, and the seating manager also being operable to assign seats for the at least some of the attendees to that event, wherein the seats are assigned based upon an assignment criteria,
    wherein the graphical user interface generator is operable to generate a report in association with the gift tracker, the report identifying each gift in the list of gifts, whether that gift is associated with the first planned event, and whether that gift is associated with the second planned event.

12. The system of claim 11, wherein the assignment criteria is selected from among the group of randomize, seat according to group information, seat according to preferences, and seat according to guest interests.

13. The system of claim 12, wherein the seating manager provides an interactive interface for the user to select table size and table placement in the virtual event configuration.

14. The system of claim 11, wherein a first set of the seats are assigned according to group information, a second set of the seats are assigned according to guest interests and a third set of the seats are assigned by the user.

15. The system of claim 14, wherein a fourth set of the seats are randomly assigned.

16. The system of claim 11, further comprising a task manager operable to generate a series of tasks pertaining to at least one of the first planned event or the second planned event, a first one of the tasks including obtaining and storing the guest contact information and a second one of the tasks including obtaining and storing the guest interest information, wherein the guest list manager is further operable to retrieve the stored guest contact information and the guest interest information for processing.

17. A system for planning a wedding, the system comprising:
    a guest list manager operable, using a processor, to prepare a list of guests for the wedding, to prepare contact information with respective ones of the invited guests for sending out and keeping track of invitations, and to track whether each guest will attend the wedding, whether that guest is also an invitee to at least one other planned event related to the wedding and whether that guest will attend the at least one other planned event;
    a guest list database operable to associate guest-related information with specific ones of the guests that includes the guest contact information, and to associate event-related information with one or more of the wedding and the at least one other planned event;
    a gift tracker operable to manage the list of gifts, to associate each gift in the list of gifts with at least one of the wedding or the at least one other planned event, and to associate respective gifts in the list of gifts with respective guests;
    a graphical user interface generator operable to generate a graphical interface of the guest list and identify the attendees to one or more of the wedding and the at least one other planned event for displaying to a user on a display;
    a seating manager operable to generate a virtual configuration of one or more of a wedding reception and the at least one other planned event on the display in response to user input, the configuration including seating for attendees identified from the list of guests, the seating manager also being operable to assign seats for the attendees based upon an assignment criteria; and
    a wedding task manager operable to generate a series of tasks pertaining to the wedding, a first one of the tasks including obtaining and storing the guest contact information, wherein the guest list manager is further operable to retrieve the stored guest contact information for processing,
    wherein the graphical user interface generator is operable to generate a report in association with the gift tracker, the report identifying each gift in the list of gifts, whether that gift is associated with the wedding, and whether that gift is associated with the at least other planned event.

18. An event planning method, comprising:
    generating, using a processor, a series of predefined tasks pertaining to a first planned event;
    modifying one or more of the predefined tasks;
    adding new tasks in response to user input;
    ranking selected ones of the predefined and new tasks based upon a ranking criteria;
    receiving a timeframe boundary;
    obtaining a list of guests for the first planned event;
    tracking whether each guest is also an invitee to a second planned event related to the first planned event;
    associating guest-related information with respective ones of the guests;
    accessing a gift registry operable to record a list of gifts;
    associating event-related information that includes the list of gifts with one or more of the first planned event and the second planned event;
    associating respective ones of the list of gifts with respective guests;
    managing the list of gifts, including associating each gift in the list of gifts with one or more of the first planned event and the second planned event, associating respective gifts in the list of gifts with respective guests, tracking whether the respective gifts associated with each respective guest has been purchased by the respective guest, and tracking whether the respective gifts associated with the respective guest has been shipped to the respective guest;
    generating a report identifying each gift in the list of gifts, whether that gift is associated with the first planned event, and whether that gift is associated with the second planned event; and
    displaying a timeline on a user display according to the timeframe boundary, the timeline identifying at least some of the predefined and new tasks falling within the timeframe boundary;
    wherein a higher priority task is more prominently displayed on the user display along the timeline than a lower priority task and wherein a set of highest priority tasks are simultaneously displayed on the user display separately from the timeline.

19. The method of claim 18, further comprising setting an expense budget for at least one of the first planned event or the second planned event.

20. The method of claim 19, further comprising associating a vendor with a line item expense for a given task.

21. The method of claim 18, further comprising:
    associating a virtual sticky note with a given task; and
    displaying the virtual sticky note on the user display when the given task is displayed on the timeline.

22. The method of claim 18, wherein the first planned event is a wedding, a first one of the predefined tasks is procuring a wedding gown, and the wedding gown task is one of the highest priority tasks.

23. A method for event planning, the method comprising:
    preparing, using a processor, a list of guests for a first planned event;
    setting group information for selected ones of the guests;

associating contact information with respective ones of the guests;

associating interest information with certain ones of the guests;

tracking whether each guest is also an invitee to a second planned event related to the first planned event;

associating event-related information with one or more of the first planned event and the second planned event;

recording a list of gifts;

associating each gift in the list of gifts with at least one of the first planned event or the second planned event;

associating respective gifts in of the list of gifts with respective guests;

generating a report identifying each gift in the list of gifts, whether that gift is associated with the first planned event, and whether that gift is associated with the second planned event;

generating a graphical interface of the guest list and a list of attendees of at least one of the first planned event or the second planned event for displaying to a user on a display;

obtaining the list of attendees to the at least one of the first planned event or the second planned event, the list of attendees being a subset of the guest list;

generating a virtual event configuration for the at least one of the first planned event or the second planned event on the display in response to user input, the configuration including seating for at least some of the attendees on the list of attendees for the at least one of the first planned event or the second planned event; and assigning seats for the at least some of the attendees of the at least one of the first planned event or the second planned event, wherein the seats are assigned based upon an assignment criteria.

24. The method of claim 23, wherein the assignment criteria is selected from among the group of randomize, seat according to group information, seat according to preferences, and seat according to guest interests.

25. The method of claim 23, wherein a first set of the seats are assigned according to group information, a second set of the seats are assigned according to guest interests and a third set of the seats are assigned by the user.

26. The method of claim 25, wherein a fourth set of the seats are randomly assigned.

27. The method of claim 23, further comprising:

generating a series of tasks pertaining to at least one of the first planned event or the second planned event, a first one of the tasks including obtaining and storing the guest contact information and a second one of the tasks including obtaining and storing the guest interest information; and retrieving the stored guest contact information and the guest interest information for processing.

28. A computer-implemented method for planning a wedding, the method comprising:

preparing a list of guests for the wedding;

associating contact information with respective ones of the invited guests for sending out and keeping track of invitations;

storing the contact information in a memory of a processor device;

tracking whether each guest will attend the wedding, whether that guest is also an invitee to at least one other planned event related to the wedding, and whether that guest will attend the at least one other planned event;

generating a graphical interface of the guest list identifying whether each guest is attending one or more of the wedding and the at least one other planned event for displaying to a user on a display;

generating a virtual configuration for at least one of wedding reception or the at least one other planned event on the display in response to user input, the configuration including seating for the attendees identified from the guest list;

assigning seats for the attendees based upon an assignment criteria;

generating a series of tasks pertaining to at least one of the wedding or the at least one other planned event, a first one of the tasks including obtaining and storing guest contact information;

retrieving the stored guest contact information;

recording a list of gifts;

associating each gift in the list of gifts with one or more of the wedding and the at least one planned event;

associating respective gifts in the list of gifts with respective guests;

generating a report identifying each gift in the list of gifts, whether that gift is associated with the wedding, and whether that gift is associated with the at least one planned event; and the processor device processing the stored guest contact information to generate guest list information.

29. A system for event planning, the system comprising:

a portal operable, using a processor, to obtain a list of guests for a first planned event;

a guest list manager operable to manage the list of guests for the first planned event, and to track whether each guest is also an invitee to at least one other planned event related to the first planned event;

a guest list database operable to associate guest-related information with respective ones of the guests, and to associate event-related information with one or more of the first planned event and the at least one other planned event;

a gift tracker operable to manage the list of gifts, to associate each gift in the list of gifts with one or more of the first planned event and the at least one other planned event, and to associate respective gifts in the list of gifts with respective guests; and a graphical user interface generator operable to generate a graphical user interface for enabling display of at least some of the guest-related information and event-related information to a user, wherein the graphical user interface generator is operable to generate a report in association with the gift tracker, the report identifying each gift in the list of gifts, whether that gift is associated with the first planned event, and whether that gift is associated with the at least one other planned event.

30. The system for event planning according to claim 29, further comprising a gift registry operable to record a list of gifts.

31. The system for event planning according to claim 30, further comprising a gift tracker operable to manage the list of gifts.

32. The system for event planning according to claim 31, wherein the gift tracker is operable to associate each one of the list of gifts with at least one of the first planned event or the other planned event.

33. The system for event planning according to claim 31, wherein the gift tracker is operable to associate respective ones of the list of gifts with respective guests.

34. The system for event planning according to claim 33, wherein the gift tracker is operable to track whether a respective gift associated with a respective guest has been purchased by that guest.

35. The system for event planning according to claim 34, wherein the gift tracker is operable to track whether a thank you communication has been sent to that guest.

36. The system for event planning according to claim 33, wherein the gift tracker is operable to track whether a respective gift associated with a respective guest has been shipped to that guest.

37. The system for event planning according to claim 31, wherein the gift registry is a bridal registry, and the gift tracker is operable to track whether a respective gift associated with a respective guest has been shipped to a respective bride or groom.

38. The system for event planning according to claim 30, wherein the report generated by the graphical user interface generator further identifies, for each guest in the list of guests, whether at least one gift in the list of gifts is associated with that guest, and one or more of (i) whether that gift has been purchased by that guest or (ii) whether that gift has been shipped to that guest.

39. The system for event planning according to claim 30, wherein the gift registry is a bridal registry, and the report generated by the graphical user interface generator further identifies whether at least one gift in the list of gifts has been shipped to a respective bride or groom.

40. The system for event planning according to claim 30, wherein the graphical user interface generated by the graphical user interface generator enables display of a link to access the gift registry.

41. The system for event planning according to claim 29, wherein the graphical user interface generated by the graphical user interface generator enables display of a link to access a gift registry external to the system for event planning.

* * * * *